US008091733B2

(12) United States Patent
Janet et al.

(10) Patent No.: US 8,091,733 B2
(45) Date of Patent: Jan. 10, 2012

(54) AUTOMATED ARTICLE DISPENSATION MECHANISM

(75) Inventors: Jason A. Janet, Durham, NC (US); David Reinfeld, Englewood, NJ (US)

(73) Assignee: RxMedic Systems, Inc., Raleigh, NC (US)

( * ) Notice: Subject to any disclaimer, the term of this patent is extended or adjusted under 35 U.S.C. 154(b) by 0 days.

(21) Appl. No.: 12/798,551

(22) Filed: Apr. 6, 2010

(65) Prior Publication Data

US 2010/0268376 A1 Oct. 21, 2010

Related U.S. Application Data

(63) Continuation of application No. 10/886,494, filed on Jul. 7, 2004, now Pat. No. 7,726,514.

(51) Int. Cl.

| | |
|---|---|
| ***B65G 59/04*** | (2006.01) |
| ***B65H 3/08*** | (2006.01) |
| ***B65H 5/00*** | (2006.01) |
| ***G07F 11/10*** | (2006.01) |

(52) U.S. Cl. ............ 221/211; 211/224; 211/252; 211/9; 211/13; 211/195; 211/196; 211/200; 221/202; 221/203; 221/207; 221/254; 221/258; 221/263; 221/266; 221/277; 221/298; 221/253

(58) Field of Classification Search .................. 221/211, 221/252, 9, 13, 195, 196, 200, 202, 203, 221/207, 254, 258, 263, 266, 277, 298, 253
See application file for complete search history.

(56) References Cited

U.S. PATENT DOCUMENTS

| | | | | |
|---|---|---|---|---|
| 3,412,908 | A * | 11/1968 | Ferrault | 222/636 |
| 4,018,358 | A * | 4/1977 | Johnson et al. | 221/7 |
| 4,664,289 | A * | 5/1987 | Shimizu et al. | 221/2 |
| 5,027,725 | A * | 7/1991 | Keeton | 111/184 |
| RE35,743 | E * | 3/1998 | Pearson | 221/2 |
| 6,085,938 | A * | 7/2000 | Coughlin | 221/203 |
| 2003/0111484 | A1* | 6/2003 | Pearson et al. | 221/211 |
| 2003/0116068 | A1* | 6/2003 | Sauder et al. | 111/180 |
| 2005/0224510 | A1* | 10/2005 | Remis et al. | 221/69 |
| 2008/0061074 | A1* | 3/2008 | Remis et al. | 221/69 |

* cited by examiner

*Primary Examiner* — Gene Crawford
*Assistant Examiner* — Rakesh Kumar
(74) *Attorney, Agent, or Firm* — Thomas L. Moses; Monahan & Moses, LLC

(57) ABSTRACT

Disclosed is a system for collecting, sorting, counting and consolidating an unorganized pool of solid or semi-solid articles such as pills for dispensation. Specifically, the articles are extracted from inside a bin using attraction points on a transport substrate and sorted into containers in finite quantities. The system consists of several components, preferably including a torque source, a counter and a vacuum source, which are uniquely integrated onto a single end-effector to reduce cost and redundancy by servicing several bins. Further, the system presents a method of attracting and carrying pills using negative vacuum pressure, gravity and centrifugal force. This centrifugal force holds articles to the local attraction points and is provided by the spinning of the transport substrate. Pills are collected from the bin or plenum at the local attraction points, counted, cleaved from the local attraction points and guided to a container or vial.

18 Claims, 26 Drawing Sheets

AUTOMATED ARTICLE DISPENSATION MECHANISM

CROSS-REFERENCE TO RELATED APPLICATIONS

This continuation application claims the benefit of U.S. patent application Ser. No. 10/886,494, filed Jul. 7, 2004 now U.S. Pat. No. 7,726,514, which is herein incorporated by reference in its entirety.

FIELD OF THE INVENTION

This invention relates to pill collecting and dispensing devices. In particular, this invention is designed to rapidly extract, sort, count and consolidate multiple solid and semi-solid articles using a torque and vacuum source. This invention has specific application in the pharmaceutical industry as an automated pill dispenser, but it can be applied to any system that requires loose and unorganized articles inside a bin to be sorted into finite quantities and consolidated into containers outside of the bin.

BACKGROUND OF THE INVENTION

The market for automated pharmacy equipment is increasingly in need of a device that reliably, cost-efficiently, and rapidly automates the process of filling a prescription with minimal risk of contamination. This industry extends to both the retail and hospital markets.

Pricing pressures and shrinking margins have forced retail pharmacies to rely more on technological solutions to improve process efficiency, performance and cost. The number of annual prescriptions continues to grow while a shortage of pharmacists remains. Consequently, the number of pharmacists in the workforce has fallen behind the increase in prescription demand.

Also, the increasing pressure from consumers to lower drug prices and fixed costs from pharmaceutical suppliers has led to decreasing margins. This trend is projected only to worsen in the future.

Further, professional skills in the hospital segment should be directed to primary care rather than pill-counting and a great need exists to replace obsolete technology to fill individual and outpatient prescriptions. Currently, both hospitals and nursing homes use products called “nursing stations,” which generally contain a smaller version of the pharmacy contained within the institution. However, these products are cumbersome and outdated.

With regard to dispensing medication in the hospital and nursing home segment, prescriptions are dispensed in single doses. This market is in great need of convenience, security and inventory control. Currently, hospitals use centralized pharmacies to prepare and dispense medications, which require advance notice and sometimes results in delivery errors. Additionally, many hospitals store commonly dispensed medications in locked cabinets on a specified floor where they are commonly administered by nurses or doctors who retrieve the prescription in individual doses and administer it to the patient. A main issue with the nursing station units is that more than one dose is accessible at a time, which can lead to the problem of pill theft. To avoid this problem, many pharmacies monitor each unit on-line on a daily basis. This manages inventory and also prevents abuse. However, an automated pill counting design would result in a dramatic improvement in inventory control, efficiency and cost by eliminating overhead and the amount of time individuals must spend performing the steps currently involved in pill dispensation.

With regard to drugstores and other places where pharmaceuticals are sold, industry trends in prescription growth, store construction and workforce shortages predict that stores without automated systems will face intense competition in terms of price and service from stores with more cost-efficient means of delivering prescriptions to their customers. Thus, a way to cut operational costs while maintaining a high level of customer service with a shortage of pharmacists and increasing prescription demand is to use technology to automate the prescription filling process.

Presently, a high-throughput approach to pill dispensation has involved the two steps of fluidization and singulation to extract individual pills from a bin. Additionally, this approach operates on a “per-bin” basis where individual bins contain every necessary subsystem component. Fluidization involves agitating, and at times levitating the pills to randomize their position and orientation. Fluidization must be continuously applied to ensure that pills have opportunities to match the singulation mechanism. Fluidization may be induced mechanically or pneumatically. Singulation involves extracting or ejecting individual pills from the fluidized bin. This generally requires an individual pill to assume a specific position at a particular point in space so that it can be aligned with the mechanism channel or port.

Many automated systems that utilize fluidization and singulation exist today in the marketplace. The McKesson Robot Rx is an automated system that uses Baker Cells, a robot retrieval arm and a central dispensing interface. The pills are stored within the Baker Cell units and singulation extracts individual pills in a channel, through centrifugal force. A variation of this design is used in hospitals to load individual doses into plastic bags for daily administration. However, this process is slow due to the time required to retrieve each cell. Also, the equipment requires a large amount of floor space.

A design by Parata fluidizes and singulates pills using high pressure air, air ejectors, and solenoid control valves. A centralized vacuum circulates pills in the hopper while outbound jets use air flow to extract individual pills and drive them through a nozzle or spout. A separate pneumatic jet is used to redirect overcounts of pills back into the bin. Each bin contains a microprocessor, multiple solenoids, counting sensors, actuators and a connection for network communications. These control components occupy a large volume of bin space, reducing the volume available for pills. A minimum number of pills are needed to support fluidization.

The known art includes attempts to use a vacuum source to attract pills and a torque source to rotationally transport pills for counting and dispensing purposes. Regarding this feature, two designs are noteworthy.

One design uses a vacuum drum pill counter used to count and dispense pills or tablets using a vacuum source. The device includes a counter housing containing a vacuum drum, which includes a front wall, a rear wall and a perimeter wall. The front wall contains a plurality of pill apertures for attracting pills to the exterior front wall of the drum through a vacuum source that draws a vacuum through the inside of the drum to hold the pills in place. A torque source connected to the vacuum drum is used to rotate the vacuum drum. A pill separator removes pills attached to the pill apertures onto a pill shelf and a sensor attached to the housing detects the removal of the pills. A pill feeder is attached to the housing to regulate the amount of pills, which come into contact with the drum. This prevents a large volume of pills from piling on the apertures of the drum and affecting the consistent retention of pills on the pill apertures.

Several disadvantages are associated with this design, namely, the placement of pill apertures on the exterior of the rotating drum requires that the vacuum source be strong enough to attract pills to the apertures and overcome the centrifugal force caused by rotation of the drum. Thus, as the drum increases speed to pick up pills more quickly, the centrifugal force works against the vacuum force. As a result, the vacuum force must be increased as well, requiring more power. Further, the use of an external pill feeder to regulate the amount of pills that come into contact with the pill apertures discourages the maximum possible number of pills from being collected and results in decreased efficiency.

Another design uses a flat disk with pill apertures located on the exterior flat surface. A vacuum drive wheel and vacuum source are applied to attract pills resting against the disk to the apertures. The disk rotates and carries the pills until they are separated one at a time by a separator wall. A photoelectric cell at the discharge, opening counts each pill and a continuously feeding pill cassette positions pills against the flat disk. An agitator consisting of radial spokes turns with the conveying wheel to break up pills and prevent them from bridging together.

This design also attracts pills to the exterior flat surface of a solid flat disk, and thus, suffers from the same disadvantages in configuration, as previously discussed. This configuration works against centrifugal force, making it necessary to increase the power of the vacuum force in order to attract the pills Further, this system relies on an agitator to cause fluidization of the pills using a series of spokes. This however, may cause the pills to chip, break or become damaged, in addition to creating large amounts of dust leading to cross-contamination.

Many known automated dispensing systems utilize several complex system components including a counter, a type of control circuitry, sensor, motor source, and chute or slide for dispensation. A disadvantage of these systems is that each bin is comprised of dedicated subsystems for dispensing, counting and controlling. This results in redundancy (e.g., high manufacturing and maintenance costs to replicate several bins) and a higher chance of leakage.

Thus, there is a clear need for an efficient vacuum pill collector and dispenser system that works with centrifugal force to attract and hold pills, maximizes the opportunity for pill capture, maximizes efficient usage of space, eliminates the need for fluidization or an agitator and eliminates redundancy to reduce maintenance and manufacturing costs. There is a clear need for a pill collection and dispensing device that reduces the complexity of the collection and dispensation process, costs less than current systems, is reliable, fast, requires little maintenance and has low contamination risk. The present invention is such a system.

The system of the present invention provides an effective method of pill collection, sorting, counting and dispensing using a vacuum source, a rotating transport substrate and a unique end-effector design for cost and space savings. An automated system such as the present invention can remedy many of the problems associated with manual and currently-known automatic pill dispensation. For example, it can increase counting accuracy, lower costs, expand the pharmacy's or hospital's capabilities, increase total pill volume, increase volume per bin, increase reliability and increase filling speed. The system is also easy to operate, can be integrated with other necessary systems, and has a low maintenance cost.

In short, the system of the present invention proposes a new approach to pharmacy automation, which allows a degree of scalability and modularity such that it meets the needs of customers in terms of size, cost and function. By utilizing fewer and simpler parts, the system is more cost-efficient, more compact and more reliable.

SUMMARY OF THE INVENTION

The system of the present invention is an automated pill collection and dispensing system for application in both the retail and hospital market segments. The design is comprised of several subsystem components. The system is capable of rapidly and efficiently extracting, counting, sorting, and dispensing loose and unorganized articles including but not limited to pills, candy, grain, beans, and discrete components stored in multiple bins. While the system may be used in the collection and dispensation of loose and unorganized articles, pills will be used throughout this description for purposes of example. Certain subsystems of the present invention are embedded on a unique "end-effector" design, which improves operational efficiency of the system. The end-effector eliminates redundancy, cost and overhead by incorporating many components of the system into one separate device, which can service multiple bins. This eliminates the outdated and inefficient approach of "per-bin" solutions.

The system includes a transport substrate ("TS") residing inside a bin and communicating with a vacuum source to facilitate article capture. The TS can be many shapes, including but not limited to, nested bowls, a hollow ring, a hollow cylinder, or any other shape that provides a lip or internal surface. Distributed along the internal surface of the TS are apertures, or local attraction points ("LAPs"), which attract and hold pills (or other articles) with negative vacuum pressure. The surface of the TS may be flat or contoured. The TS is further driven by a crank or motor, which creates a torque source. This allows the TS to capture pills on the bottom of the internal surface and carry pills to the top, underside of the TS where they are removed for counting and discharge. Since the pill apertures reside on the internal surface of the TS, the centrifugal force created by the torque source encourages pills to hold to the LAPs. Thus, it is not necessary for the vacuum source to overcome centrifugal force as is the case when pills are situated on external surfaces, as found in many known systems. In fact, at high RPM's the centrifugal force actually assists in holding the pills to the LAPs.

In the system of the present invention, pills are piled on the bottom of the TS naturally due to gravity, which maximizes the opportunity for pill capture even if relatively few pills are left in the bin. Further, the slanted design of the bin floor facilitates consolidation of the pills at the bottom of the TS. Thus, there is no minimum number of pills required to achieve fluidization or singulation within a bin. This eliminates the need to overstock produce and risk product expiration. The system is also efficient in that a large number of pills may reside in the bin without overwhelming the system. Thus, it is not necessary to regulate the amount of pills using a pill feeder to maintain a narrow margin of pills in the bin. The design of the present invention further eliminates the need for an agitator since there is no risk of the pills bridging or jamming.

Alternatively, the system of the present invention may incorporate a compressed air approach in place of a vacuum source. The compressed air would blow by the local attraction points and attract pills either through the Bernoulli or Venturi effect. Further, using a centrifugal pump embedded in the bowls in addition to a vacuum source could increase the effect of the centrifugal force at high RPMs.

The system of the present invention includes a combination of unstable surface contours and a mechanical filter to remove misplaced articles from the surface of the bowl. This is known as "misplaced article ejection" ("MAE"). These may be pills, which attach to the surface at points not designated as LAPs or points where more than one pill attaches to an LAP. A convex surface or "cow-catcher"-like filter can be used to orient pills on the LAP and eject pills that are sharing an LAP. In the preferred embodiment, the filter may be unique to pill type and thus capable of sorting through a variety of pill types mixed together in one bin or alternatively in multiple separate bins.

Additionally, a cross-flow (i.e., air pressure perpendicular to the direction of pill flow), created by the vacuum source or from the focused air source, may be used to sweep off any misplaced articles not associated with an LAP. However, one skilled in the art will recognize that any number of mechanisms including, but not limited to, a physical brush or curtain, positive pressure (repulsive force), unstable points on the TS, and centrifugal/centripetal acceleration may be used for purpose of sweeping away misplaced articles not associated with a LAP.

In the system of the present invention, gravity further assists with removing misplaced pills or articles, which will fall off when they reach the upper internal surface of the TS if not completely attached to a LAP.

In the system of the present invention, a shear plate shaped to fit the contour of the TS is used to separate pills for collection at a "cleave point" designed to minimize damage to the pills. Further, a neutralizing plate, blocking the vacuum to the LAPs, may be incorporated to assist in separating the pills from LAPs and improving overall vacuum efficiency.

Just prior to the point of separation, a counter created by a cross-beam LED and photo-detector is used to keep track of the number of pills dispensed. However, one skilled in the art will recognize that any number of detection mechanisms including, but not limited to, structured light, computer vision (image/pattern analysis), echo-return or turnstile may be used for this purpose. Alternatively, this "counting zone" may occur just after the "cleave point" or may occur redundantly on the end-effector. In the preferred embodiment, several counters may be held on the end-effector and thus re-used for multiple bins.

In the system of the present invention, a simple chute or channel, called a "separated article guide" (SAG) is used to carry pills into a storage point or vial by gravity and momentum. Additionally, the vacuum source may be used to boost the speed of articles on the channel, forcing the article down faster than the force of gravity and momentum alone.

A mechanism controller drives and monitors the automated article dispenser. It is comprised of a micro-controller device, keypad, control circuitry, LCD, etc., and is integrated with the end-effector to serve the entire system. The mechanism controller operates the motor, which drives the torque source, controlling position and speed. It can receive commands or requests from a user for a finite number of articles from a specific bin and in response activates the other components of the system to begin extraction of articles. The mechanism controller also keeps track of the number of articles that pass through the counting zones. Further, the mechanism controller may act as a closed-loop controller, which increases vacuum pressure or speed to collect the expected number of articles in response to data collected from the sensor. Thus, the mechanism controller responds to requests or commands for retrieving a specific quantity for dispensation into containers or vials.

Additionally, the mechanism controller can be controlled from a user interface at a standard computer terminal or, alternatively a specialized terminal for this purpose. The mechanism controller can be given manual input from the user interface to position the end-effector or to request a finite number of articles from a specific bin.

An additional component of the system of the present invention is an overflow article return. If the total of separated articles exceeds the desired amount of articles, the extra articles are redirected back into the bin. The overflow article return operates by using a physical barrier such as a gate to prevent the extra pills from entering the container or vial. Preferably, the gate is controlled by the mechanism controller, which recognizes when the number of desired pills has been reached. The pills can then be forced back through the chute using a unique air pressure approach, which originates from behind the pill to flush it out back to the bin. Also, the airflow direction of the vacuum boost can be reversed using the vacuum source's exhaust air to force pills back through the SAG. Meanwhile, the transport substrate may reverse direction to return the extra pills back to the bin.

Significantly, a number of the components of the present invention are integrated onto an end-effector. This minimizes redundancy by combining the vacuum, micro-controller, counter and torque source (or motor) onto one device that is used for all bins. In presently-known designs, most or all of these components have been dedicated to each bin.

The end-effector consists of 1) a single controller which interfaces to any bin; 2) a single vacuum port which mates to any bin on contact to provide negative pressure for the local attraction points, the channel booster pressure, cross-flow pressure for misplaced article ejection, and pressure for overflow article return; 3) a single torque source (or motor) that rotates any transport substrate and controls the speed and position depending on the number of pills necessary to dispense, which can brake to stop movement and reverse direction to return pills to the bin pile; and 4) a counter to count pills immediately prior to the cleave point.

The system of the present invention could also be modified to work with a single bin rather than multiple bins.

Thus, it is an objective of the system of the present invention to create an automated system for efficient extracting and dispensing of various articles.

It is also an objective of the system of the present invention to provide a vacuum source, which uses negative pressure to attract pills to local attraction points on the internal surface of a transport substrate.

Another objective of the system of the present invention is to provide a torque source, which rotates the transport substrate and creates a centrifugal force, which assists in holding pills to the local attraction points.

A further objective of the system of the present invention is to automatically sort, count and dispense a select number of solid or semi-solid articles such as pills from a bin or plenum.

Yet another object of the present invention is to use gravity to assist in the association of articles with the transport substrate.

Another object of the system of the present invention is to utilize a centralized vacuum source to perform several functions.

Yet another objective of the system of the present invention is to integrate multiple subsystems for dispensing, counting and controlling onto one end-effector for servicing multiple bins.

Still another objective of the system of the present invention is to reduce replication, complexity, cost and maintenance requirements for filling prescriptions.

Another objective of the system of the present invention is to prevent prescription overfilling and underfilling.

A further objective of the system of the present invention is to provide a unique bin floor shape for consolidation of pills.

Another objective of the system of the present invention is to eliminate the need to regulate the amount of pills present in the bin.

Yet another objective of the system of the present invention is to utilize centrifugal force to eliminate misplaced articles.

Another objective of the present invention is to eliminate the need for induced fluidization and singulation of pills in a bin.

A further objective of the present invention is to provide a cleave point to separate pills and a chute to guide pills toward a vial.

An additional objective of the present invention is to provide a mechanical filter to eliminate misplaced articles.

A further objective of the present invention is to use gravity to assist in eliminating misplaced articles.

Another objective of the present invention is to minimize contamination risk to pills.

DETAILED DESCRIPTION OF THE PREFERRED EMBODIMENTS

A further understanding of the present invention can be obtained by reference to preferred embodiments as set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, but merely to clarify and exemplify the invention.

The vacuum driven pill collection and dispensing system is shown in FIGS. 1 and 3-16. It is noted that the system may also apply to any solid or semi-solid articles such as candy, grain, discrete components, beans, tablets, capsules, vitamins, dietary supplements, etc. that require sorting and consolidation.

Figure 1A:
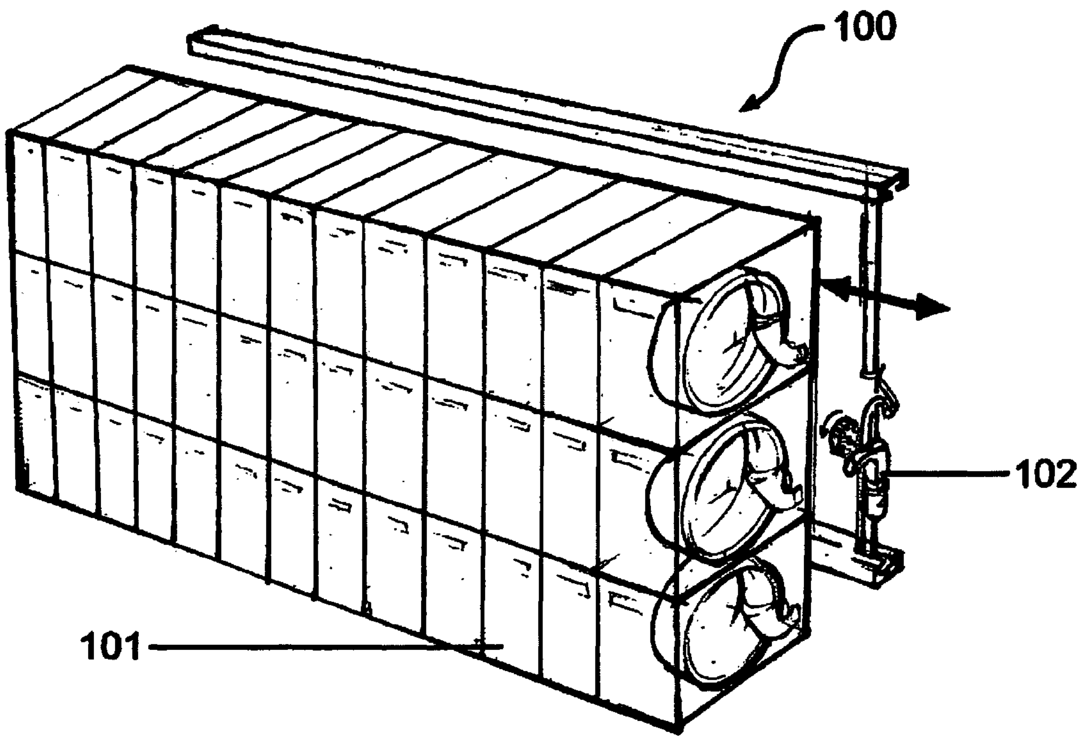
FIG. 1A is a macro-level overview drawing of the automated article dispensing system of an embodiment of the present invention.

FIG. 1A is an overview macro-level drawing of an automated pill collection and dispensing system 100 of an embodiment of the present invention. The system consists of several identically designed bins 101. Preferably, each bin 101 contains a unique type of pill. In order to fill prescriptions, vials must be carried to the different bins. The system of the present invention minimizes replication by integrating many of the subsystem components that allow for counting, extracting and dispensing onto an end-effector 102, which is used to service each bin 101. The system is operated by a mechanism controller that drives and monitors the automated dispensing system and operates as a closed loop controller. This configuration eliminates ductwork, minimizes leakage points, reduces maintenance and significantly reduces cost because there is less redundancy. As shown in FIG. 1A, end-effector 102 can travel up, down and across to make contact with any bin as required.

Figure 1B:
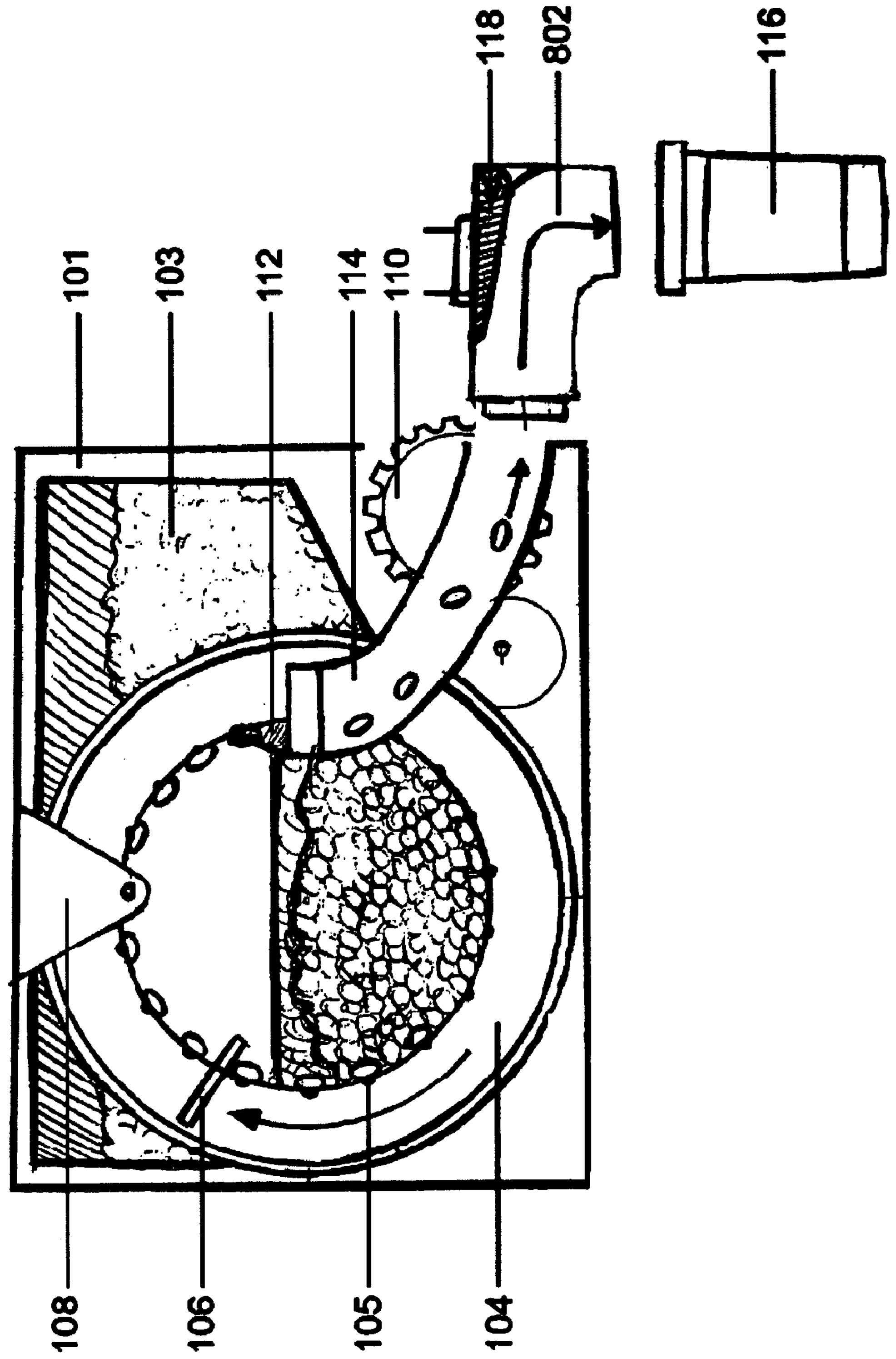
FIG. 1B is a bin-level cross-section view of a single automated article dispensing mechanism of an embodiment of the present invention.

FIG. 1B shows a cross-sectional view of an individual pill dispensing mechanism of the present invention including all subsystem components at the bin level. This figure represents operation of the bin when in contact with the end-effector and includes reusable components attached to the end-effector.

The system consists of a bin 101 filled with a multitude of pills 103. In a preferred embodiment of the present invention, there will be several bins in one system filled with uniquely different types of pills. The amount of pills contained within a bin is dependent upon bin volume and pill size. Bin 101 is designed to be slanted downward from back to front as shown in FIG. 1B to allow for consolidation of pills 103 toward the bottom front of the bin 101. Bin 101 may be constructed of any type of air sealed plastic approved for contact with pharmaceutical substances. The pills collect at the bottom front of the bin 101 where they come into contact with transport substrate 104 containing local pill apertures 105. Pill apertures 105 act as local attraction points (LAPs). Gravity assists in pills 103 finding pill apertures 105 as the pills 103 come to rest on the transport substrate 104 at the bottom front of the bin 101. Pills 103 adhere to the local attraction points through a vacuum source (not shown) that operates from inside transport substrate 104 to create negative pressure at pill apertures 105. A vacuum port allows vacuum pressure into transport substrate 104. Torque source 110 provides a motor or drive to rotate transport substrate 104 and transport pills 103 to counting zone 108 where the quantity of pills extracted is totaled. In addition to the negative pressure at the pill apertures 105, the rotation of the transport substrate 104 by the torque source 110 provides centrifugal force that additionally assists in associating the pills 103 with the transport substrate 104. Misplaced article ejection point 106 prevents straggler pills from passing through counting zone 108 to prevent miscounts (e.g., prescription over- or under-filling). In a preferred embodiment, counting zone 108 occurs before or at cleave point 112, which physically separates pills 103 from pill apertures 105. Alternatively, counting zone 108 may also be located after cleave point 112 or on the end-effector 102.

Still in motion, the pills are forced down channel 114, which acts as a separated article guide (SAG), into destination vial 116. Gate 118 opens and closes electromechanically to control pill flow into vial 116. Gate 118 works with vacuum pressure to perform overflow article return when the number of desired pills has been dispensed. The mechanism controller operates this function and appropriately shuts down the remaining subsystems. The end-effector subsequently travels to the next bin to repeat the process.

Figure 2A:
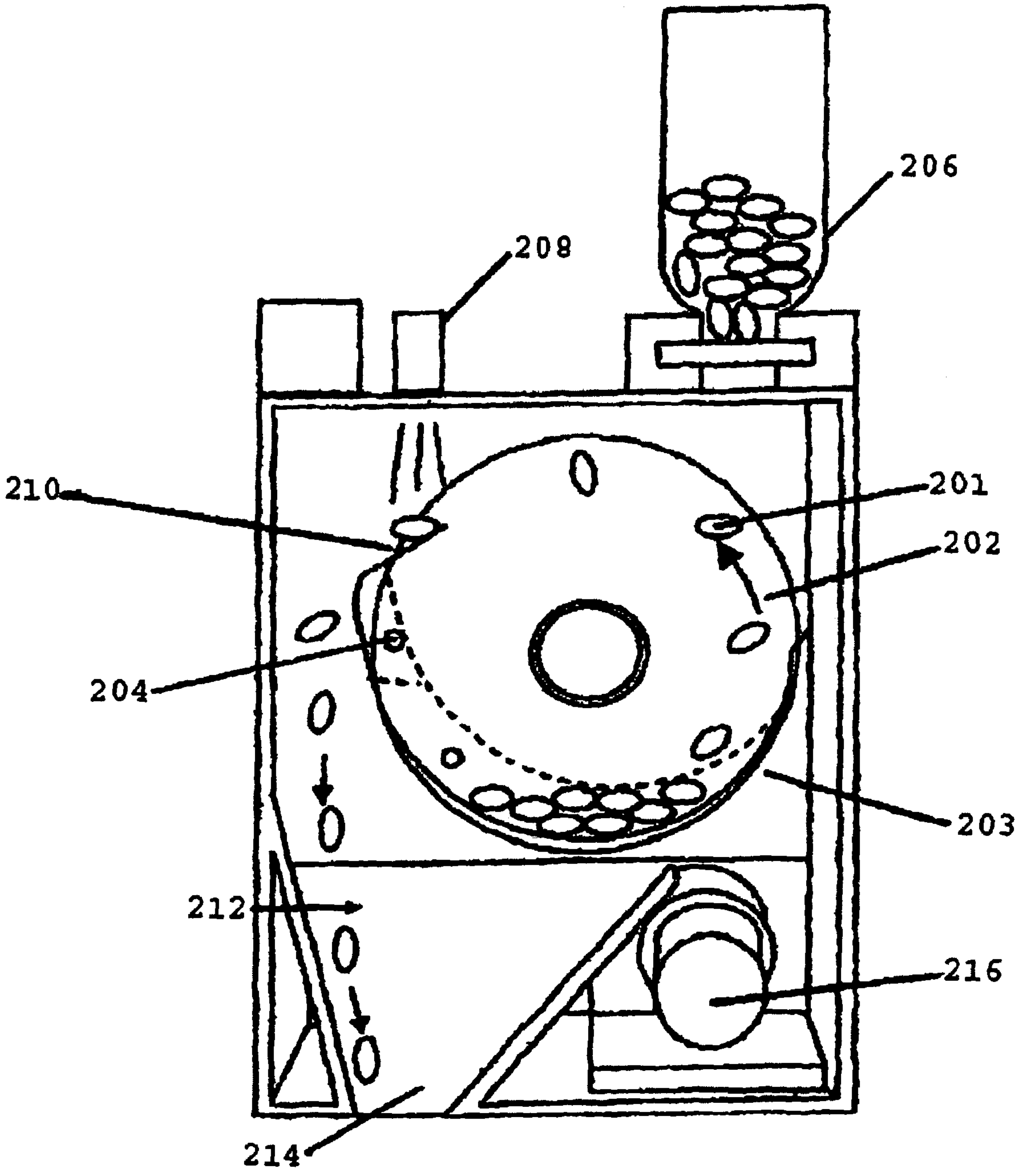
FIG. 2A depicts a typical pill dispensing system of the prior art.

FIG. 2A depicts a typical prior art pill counting and dispensing system 200. FIG. 2A shows a rectangular housing with a front and top wall. In this design, all components are located within the housing. The housing contains a vacuum drum 202, pill shelf 203, pill chute 212 leading to discharge aperture 214, counting sensor 208 and motor 216. Pill feeder 206 is positioned on the top wall of the housing. Vacuum drum 202 contains pill apertures 204 located on the front wall. A vacuum source communicates with the housing such that the vacuum source is capable of drawing a vacuum through the pill apertures 204. Motor 216 simultaneously rotates vacuum drum 202 to lift and carry pills 201 to pill separator 210 where the pills 201 are removed from vacuum drum 202. Pill feeder 206 is used to regulate the amount of pills 201 inside the housing. In this design, an excessive number of pills 201 collecting against vacuum drum 202 can negatively affect the consistent retention of pills 201 to pill apertures 204 by overwhelming the system. This is a result of the weight created by a large number of pills 201, which may bridge the pills 201 together and prevent pills 201 being picked up. However, too few pills 201 will reduce the chances of all apertures 204 coming in contact with a pill 201 and thus not operating efficiently. Also, pills 201 cannot exploit the full effects of gravity to find pill apertures 204. This is because pills 201 stack on each other and the stack lean against the end of the drum 202. The force from this leaning is significantly less than the force from the weight of the pills 201. Therefore, a complex, and often unpredictable, process of pill regulation must be performed in order for the system to operate at its potential. Further, pills 201 may not be stored in the housing but must be kept in separate bins and added to the housing as required.

Figure 2B:
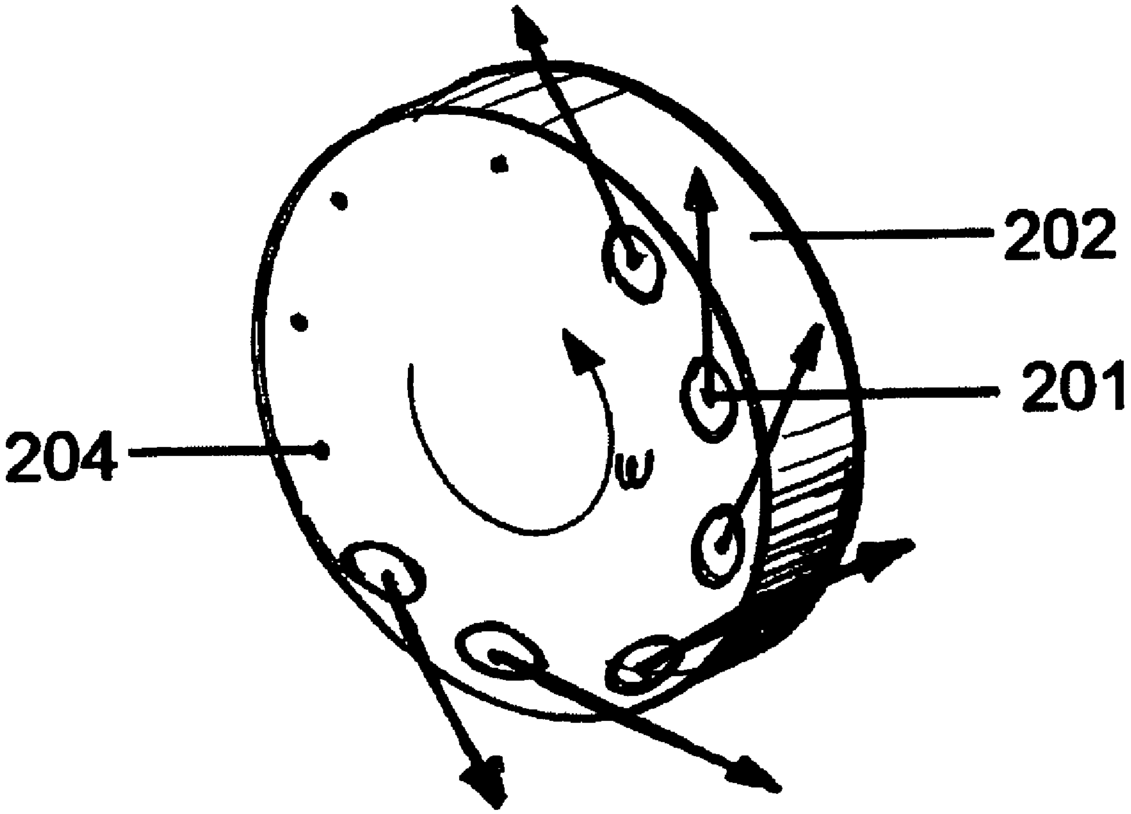
FIG. 2B depicts a detailed view of a typical vacuum drum of a pill dispensing system of the prior art.

FIG. 2B depicts a detailed view of an exemplary prior art vacuum drum 202 shown in FIG. 2A. This figure illustrates the operation of vacuum drum 202 to lift and carry pills 201 for dispensation. Pill apertures 204 are located on the outside front wall of the hollow drum. Inside the hollow drum is a channel to a vacuum source that creates negative pressure at pill apertures 204 to attract and hold pills 201 to the external surface. As shown in the figure, the hollow drum rotates to carry the pills. The rotation of the hollow drum creates a centrifugal force that works in opposition to the vacuum force holding the pills to the apertures on the front wall. Thus, the vacuum force must be strong enough to attract pills 201 to pill apertures 204 despite minimal help from gravity, as well as overcome the centrifugal force, which results from rotation of the drum.

Figure 3A:
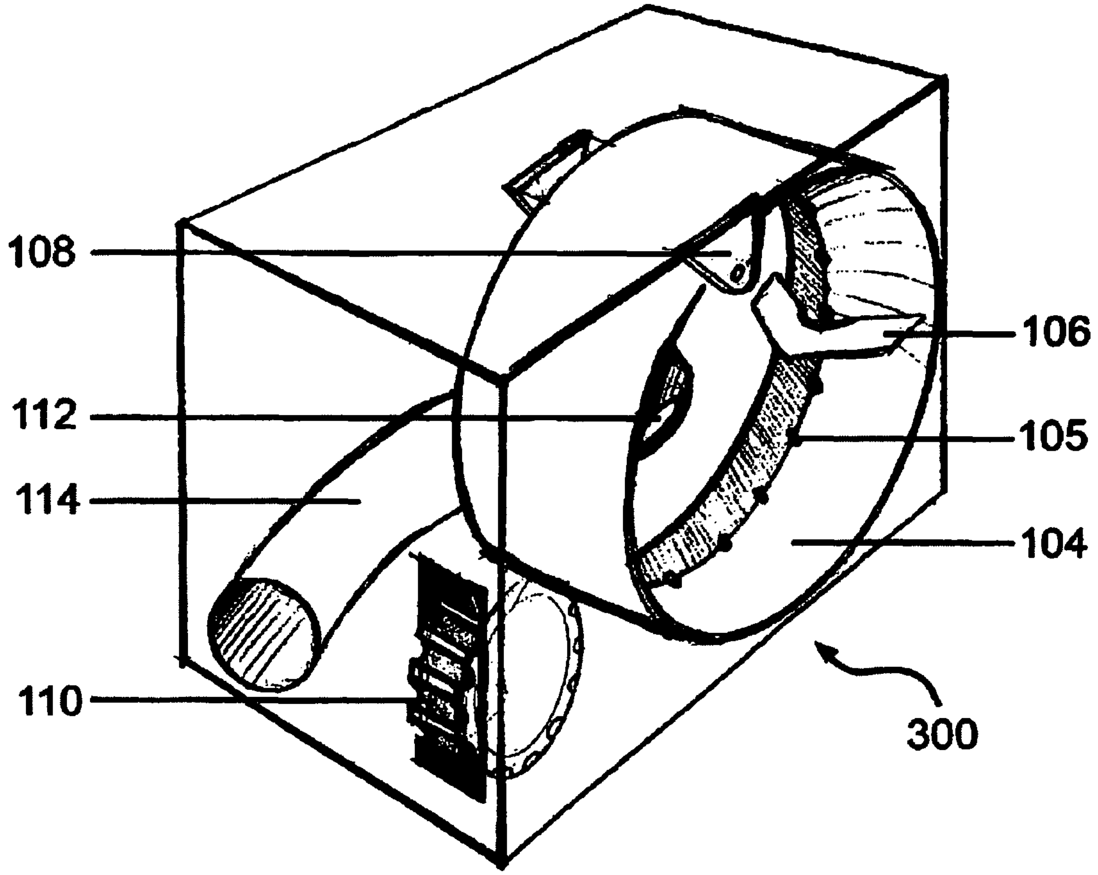
FIG. 3A depicts a front view perspective of the main structural subsystem components of a single automated dispensing mechanism of an alternative embodiment of the present invention.

FIG. 3A depicts a front perspective view of the major components of the article dispensing mechanism of an alternative embodiment of the present invention. The main components per-bin include transport substrate 104, in this case a hollow vacuum ring, pill apertures 105, misplaced article ejection 106, counting zone 108, cleave point 112, separated article guide 114 and drive gears 110 that rotate transport substrate 104 with an outside torque source. However, several of the components are preferably embedded on an end-effector and therefore not duplicated for every bin.

Figure 3B:
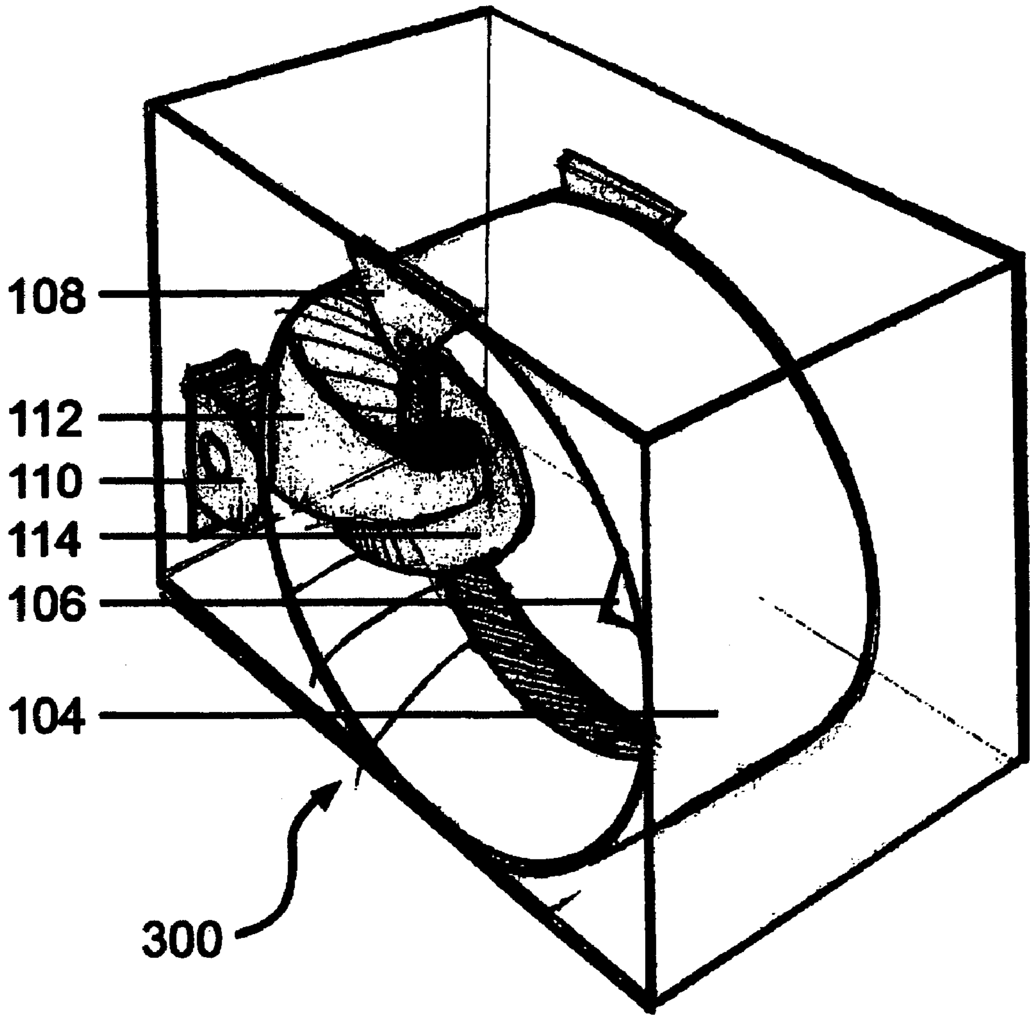
FIG. 3B depicts a rear view of the main structural subsystem components of a single automated dispensing mechanism of an alternative embodiment of the present invention.

FIG. 3B depicts a rearview perspective of system 300 including all of the main subsystem components.

Figure 4A:
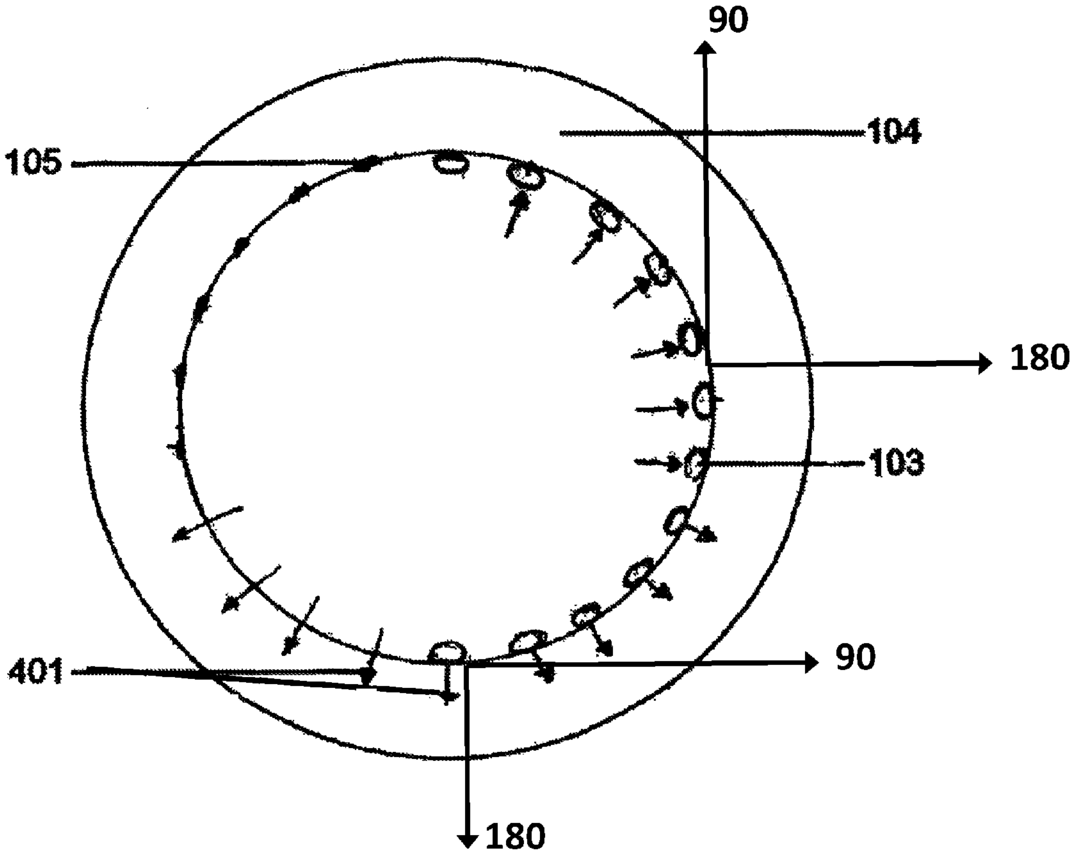
FIG. 4A depicts a detailed view of the structure and operation of the nested bowl subsystem of an embodiment of the present invention.

FIG. 4A shows a detailed view of the transport substrate 104 which may be constructed of any type of material such as plastic that is disposable after a limited number of uses and approved for contact with pharmaceuticals by the Food and Drug Administration. In the preferred embodiment, each bin includes its own transport substrate 104. Transport substrate 104 contains pill apertures 105 that function as local attraction points ("LAPs"). A vacuum force 401 inside the transport substrate attracts pills 103 to pill apertures 105 with negative pressure. The vacuum force 401 is presented through a vacuum port located on the end-effector, which mates to each bin and draws air through the transport substrate. The vacuum force 401 may be created by any type of small, quiet vacuum source 401 capable of generating a negative pressure. Gravity works in favor of pills 103 finding and adhering to pill apertures 105. Pills 103 rest upon a surface of the transport substrate 104, internal transport surface vector shown at 90, exploiting the effect of gravity to adhere to pill apertures 105 as they rotate below the collection of pills 103. Inherently, the rotation of the transport substrate 104 agitates the pills 103, which also aids in pills 103 adhering to pill apertures 105.

The pills adhere to pill apertures 105 and are carried to the top of the underside of the transport substrate 104 as it rotates. The rotation of the transport substrate 104 causes a centrifugal force 180 that works in favor with the vacuum force 401 to attract and hold pills. The faster the transport substrate 104 is rotated, the stronger the centrifugal force 180 becomes, ensuring that the pills adhere to the transport substrate 104. Thus, the centrifugal force 180 may assist in holding pills. Another advantage of this design is that is facilitates elimination of misplaced articles. When the pills reach the top of the underside of the transport substrate 104, gravity will cause the pills that are not attached to pill apertures 105 to fall down.

Figure 4B:
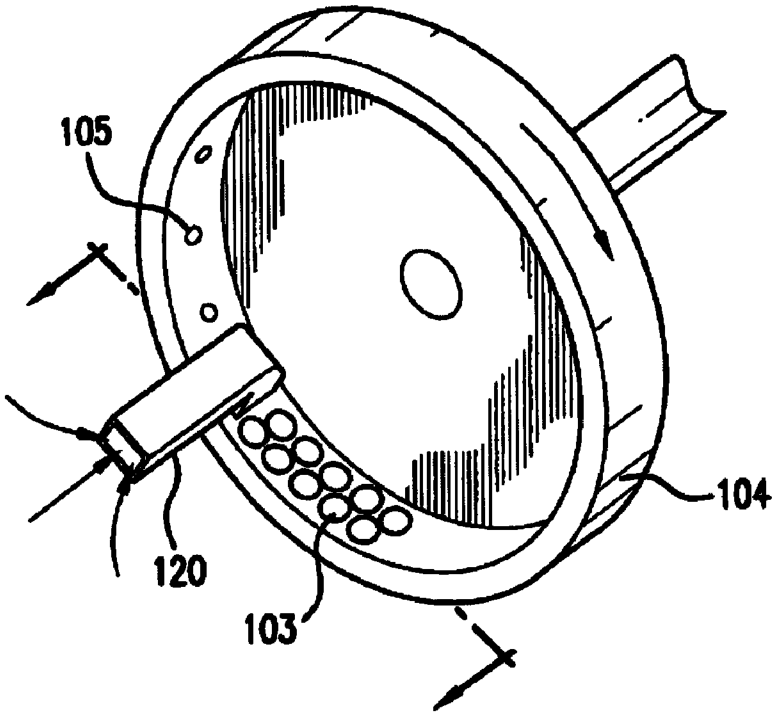
FIG. 4B depicts a transport substrate with focused air source.

FIG. 4B depicts a transport substrate 104 with a focused air source 120. As the transport substrate 104 rotates, it carries pills 103 until the force of gravity is greater than the friction of the pills against the transport substrate 104. As a result, the pile of pills 103 "thins" in the direction of rotation of the transport substrate 104. Air directed from the focused air source 120 pushes the pills 103 against the transport substrate 104, improving singulation of the pills 103 where the pile has thinned.

Figure 4C:
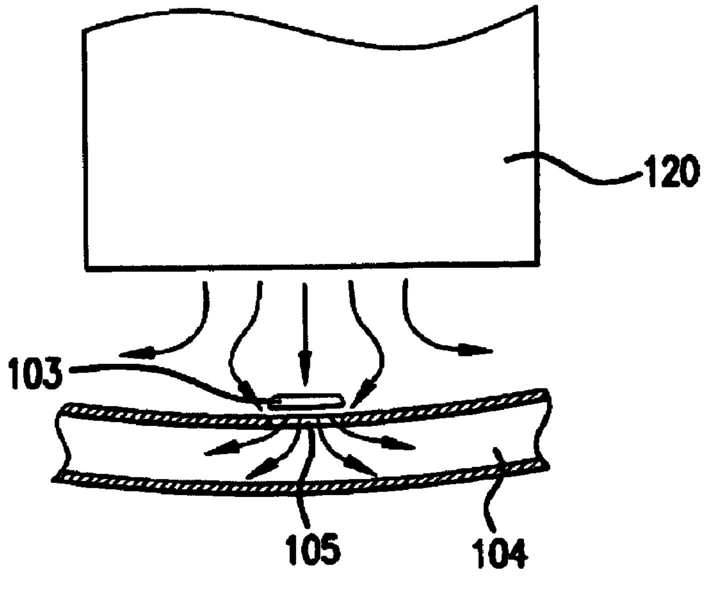
FIG. 4C depicts a magnified view of a focused air source acting upon the transport substrate.

FIG. 4C is magnified view of the output of focused air source 120, wherein the positive pressure from the focused air source 120 in conjunction with the negative pressure from the LAP 105, increases the likelihood that a pill 103 will be attracted to a LAP 105. This increases overall singulation of pills 103 and improves count rates.

Air entering the focused air source 120 is controlled by a check valve (not shown) that allows air to enter a bin 101 when the vacuum is pulled but prevents air from entering a bin 101 otherwise. The check valve may be opened passively when the vacuum is pulled or may be actively opened by a mechanism on the end-effector 102 or activated by the end-effector 102. Additionally, air entering to supply the focused air source 120 may be directed to a cross-flow airflow used for misplaced article ejection (not shown).

Figure 5A:
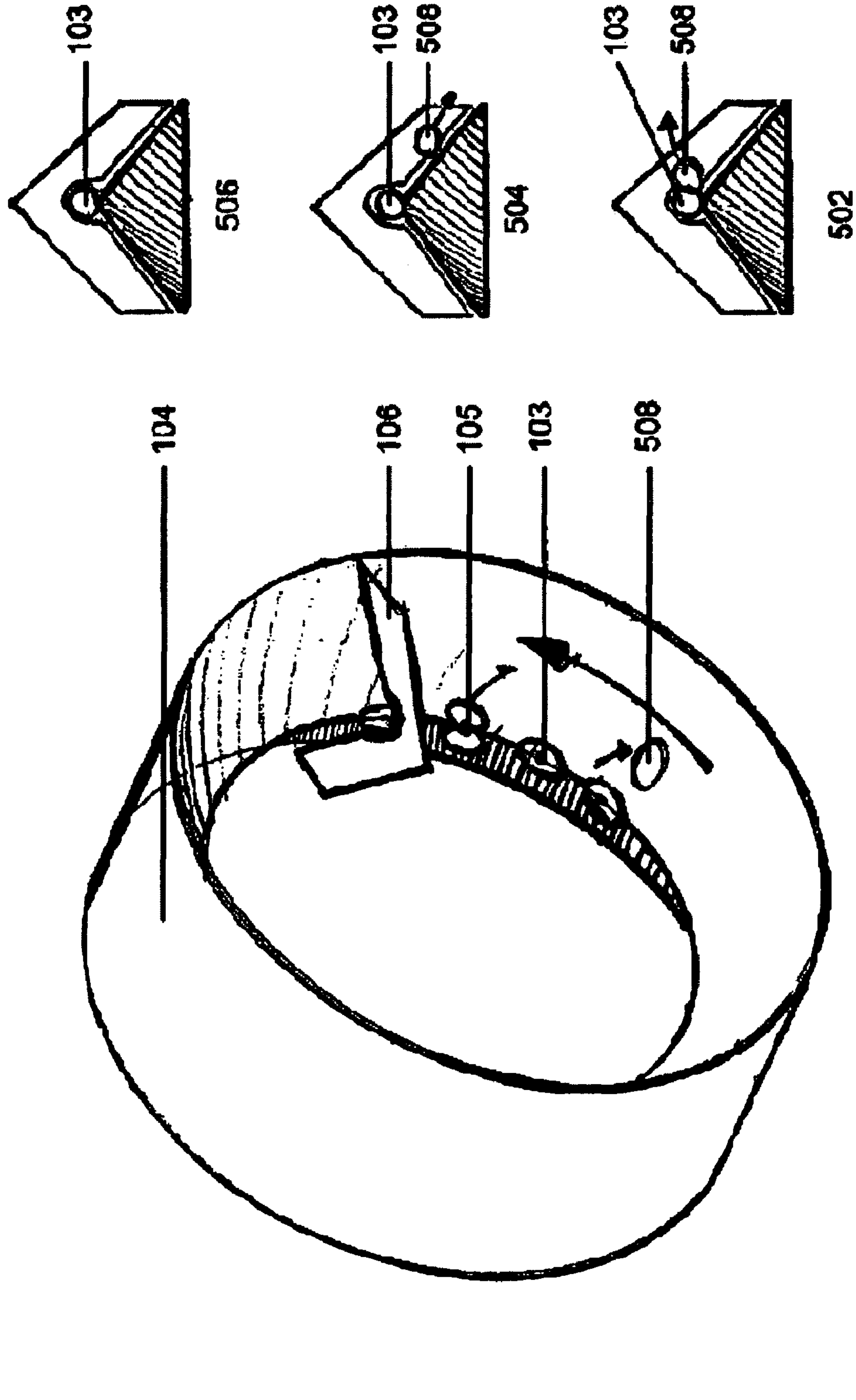
FIG. 5A depicts a detailed view of the misplaced article ejection subsystem of an embodiment of the present invention.

FIG. 5A depicts an exemplary misplaced article ejection ("MAE") device 106 of the system of the present invention. The MAE 106 prevents articles not associated with local attraction points from passing through cleave point 112 and into vial 116 (shown in FIG. 1B). The removal of straggler articles takes place before counting zone 108. Many types of MAE techniques may be employed. FIG. 5A shows an exemplary MAE "cow-catcher device" 106 that operates as a mechanical filter. Cow-catcher device 106 remains in a fixed position while the transport substrate 104 rotates. Cow-catcher device 106 filters by both orienting pills 103 on LAPs 105 and ejecting extra pills 508 that are sharing a LAP or not associated with a LAP. This is illustrated in drawings 502, 504 and 506 showing the progression in which the cow-catcher device 106 operates to remove an extra pill 508 attached to a LAP 105.

Figure 5B:
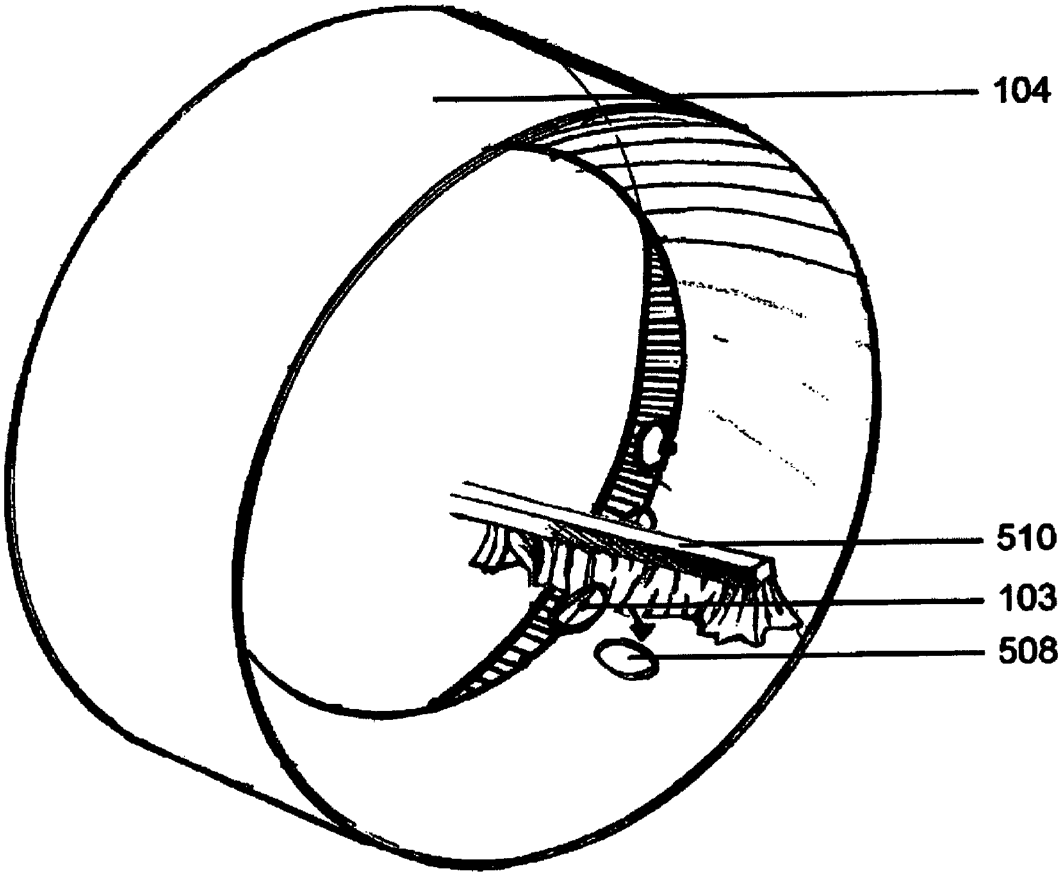
FIG. 5B depicts a detailed view of an alternative misplaced article ejection subsystem of the present invention.

FIG. 5B shows an alternative method of removing straggler articles from continuing through the rest of the system. In this figure, brush 510 is used to remove free riding extra pills 508 while the attracted pill 103 passes through the brush unaffected. In the preferred embodiment of the present invention, additional methods of misplaced article ejection may be used with the system of the present invention either alone or in combination. For example, the vacuum source may be used to create a cross-flow air flow to sweep any pills not associated with a LAP off the transport substrate 104. Further methods of misplaced article ejection include but are not limited to unstable surface contour, positive pressure, gravity, etc.

Figure 6:
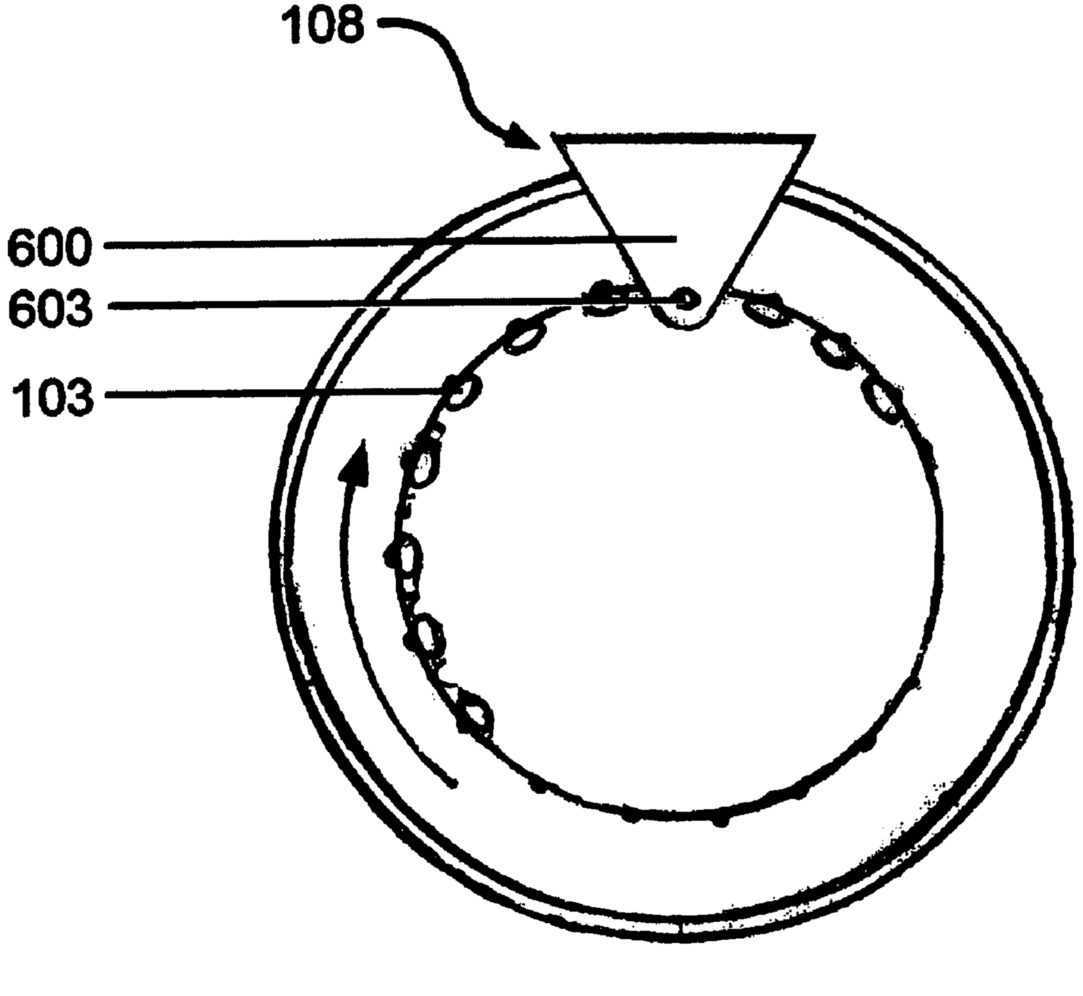
FIG. 6 depicts a view of a typical pill counter subsystem of an embodiment of the present invention.

FIG. 6 shows a typical counting zone 108 of an embodiment of the present invention. The counting zone may be located either before or after cleave point 112 (not shown). Once straggler articles are removed, break beam counter 600 is used to accurately keep track of the number of pills being dispensed. Counter 600 may be a typical prior art cross-beam and photo-detector. However, counter 600 may be embedded on an end-effector and thus not permanently affixed to a single bin. The counter is a closed-loop counter and contains a sensor 603 which may preferably be formed from visible (LED) light, infrared light or ultraviolet light, wherein the pill or article breaks the beam between the emitter and receiver. However, sensor 603 is not limited to light sensors, but could include any type of sensor capable of detecting a pill passing within a sensor's detection range, such as image/pattern analysis, echo-return, etc.

Figure 7:
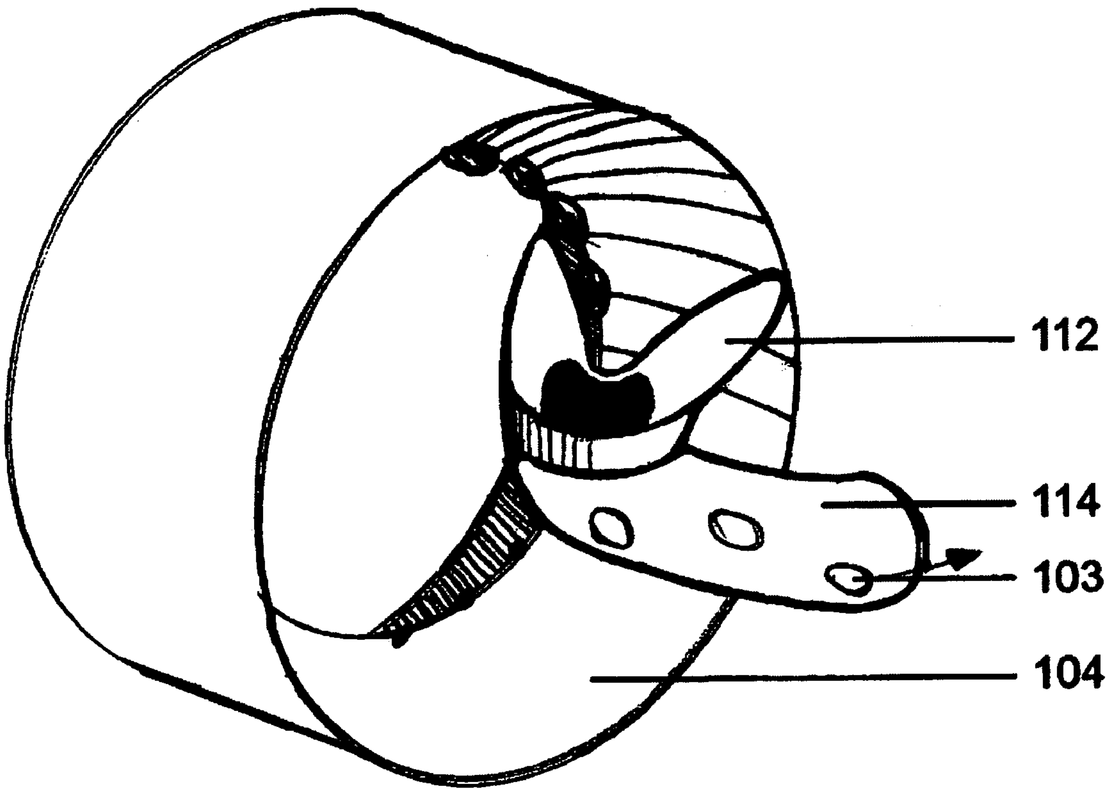
FIG. 7 depicts a detailed view of the exemplary cleave point and separated article guide subsystems of an embodiment of the present invention.

FIG. 7 depicts cleave point 112 and separated article guide 114 of the preferred embodiment of the present invention. Cleave point 112 is the point where articles are physically separated from their LAPs. In the preferred embodiment, cleave point 112 is a typical prior art shear plate, shaped to fit the contour of the transport substrate 104 and minimize pill damage. A vacuum neutralizing plate may also be used to assist in separating pills. A vacuum neutralizing plate works by blocking the negative pressure from the vacuum source at certain pill apertures 105. Placing a vacuum neutralizing plate at cleave point 112 helps ensure that the pills 103 are removed from pill apertures 105. The neutralization plate helps prevent a reduced vacuum force due to unoccupied LAPs. For example, after pills 103 are cleaved from the transport substrate 104, the LAPs are open (i.e., leaking) to the ambient environment within the bin 101, reducing the level of vacuum and efficiency at other LAPs. Blocking unused LAPs increases overall vacuum at LAPs between the bottom of the transport substrate 104 and the cleave point 112.

Once separated at cleave point 112, pills 103 are guided by a separated article guide (SAG) 114, which in the preferred embodiment is a channel. The SAG may be any type of channel, chute, slide, duct, etc., that extends from cleave point 112 to a vial 116 (not shown) or temporary storage point. The pill is dispensed through the channel by gravity and momentum. Additionally, the vacuum source may again be used to boost the speed of the pill down the channel. Pills 103 collect in vial 116 that may be any type of plastic container suitable for consolidation of a set number of pills.

Figure 8A:
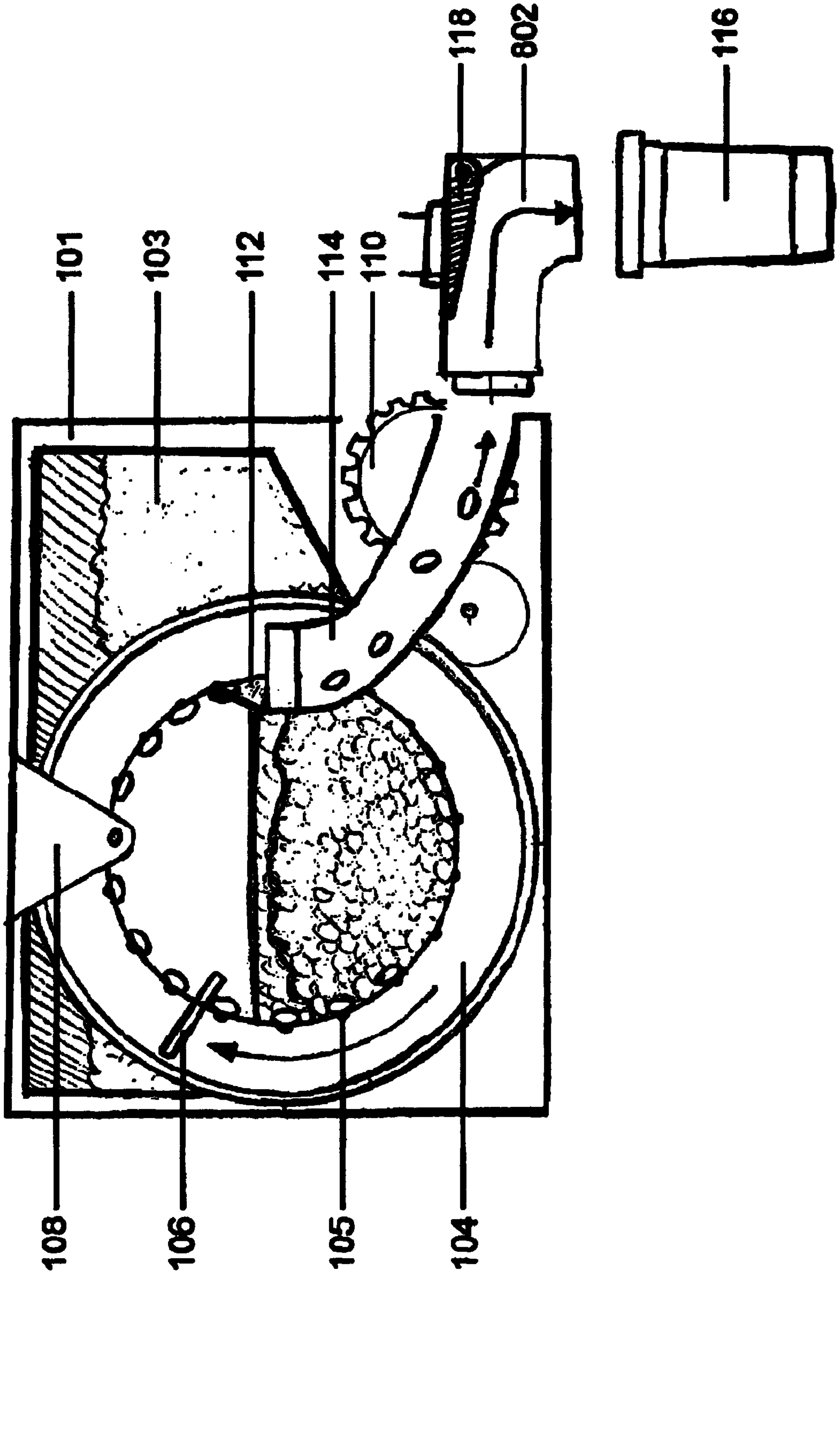
FIG. 8A depicts a view of the overflow article return subsystem of an embodiment of the present invention with a gate open.
Figure 8B:
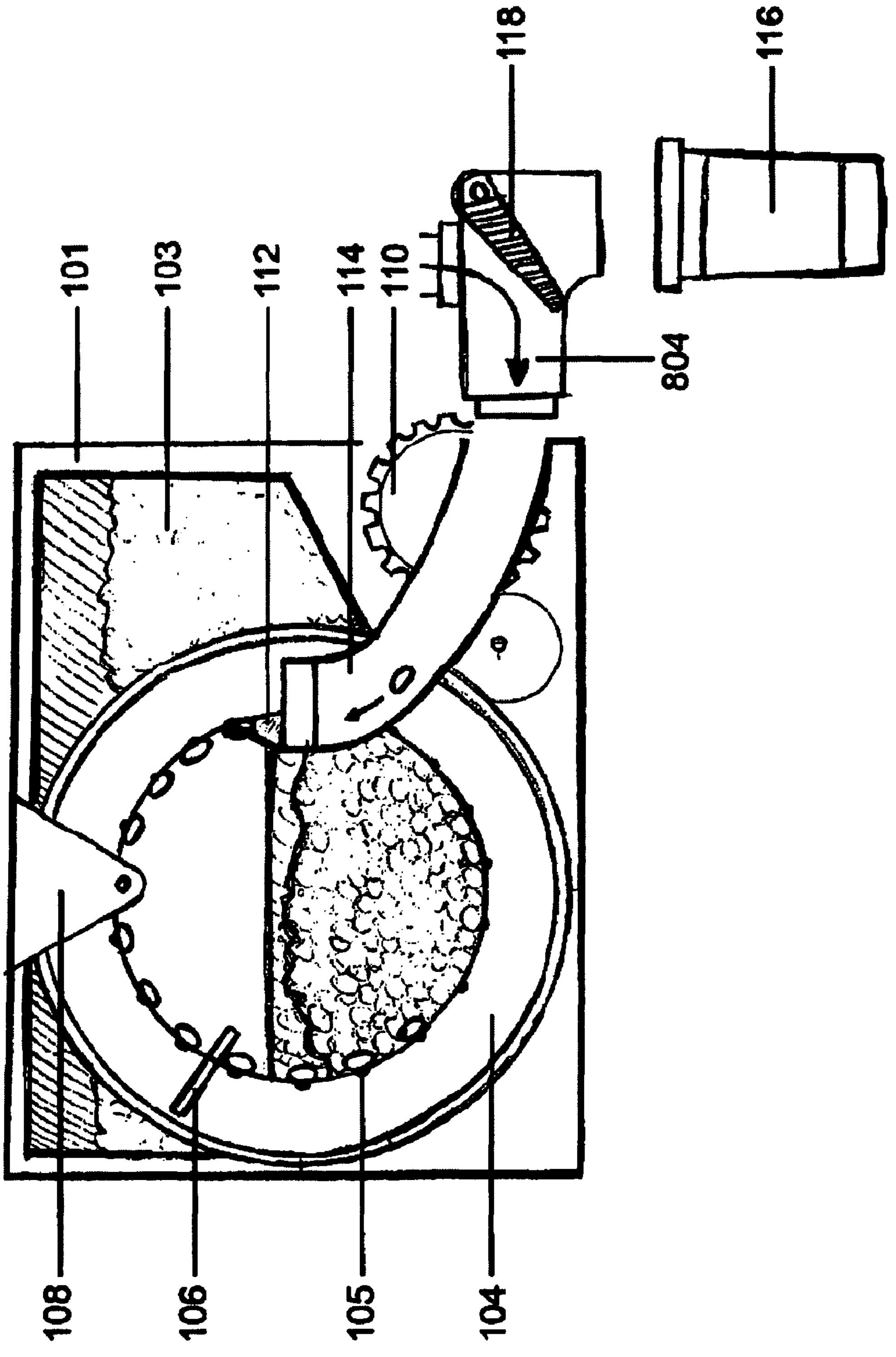
FIG. 8B depicts a view of the overflow article return subsystem of an embodiment of the present invention with a gate closed.

Once the correct number of pills is collected from a specific bin, an overflow article return mechanism is activated, as illustrated in FIGS. 8A and 8B. If too many pills are sent towards the vial, the extra pills can be blocked and sent back to the bin. Referring to FIG. 8A, pills travel from SAG 114 and into vial 116. At this point, gate 118 is open to allow pills to fill vial 116 and the vacuum boost 802 is shown to assist in forcing pills down SAG 114. Referring to FIG. 8B, gate 118 is closed, providing a physical barrier to prevent extra pills from entering vial 116. The pills are then forced back through channel 114 via reverse air pressure 804. The airflow direction of the vacuum boost may also be reversed using the exhaust air to return extra pills back to bin 101.

Figure 9:
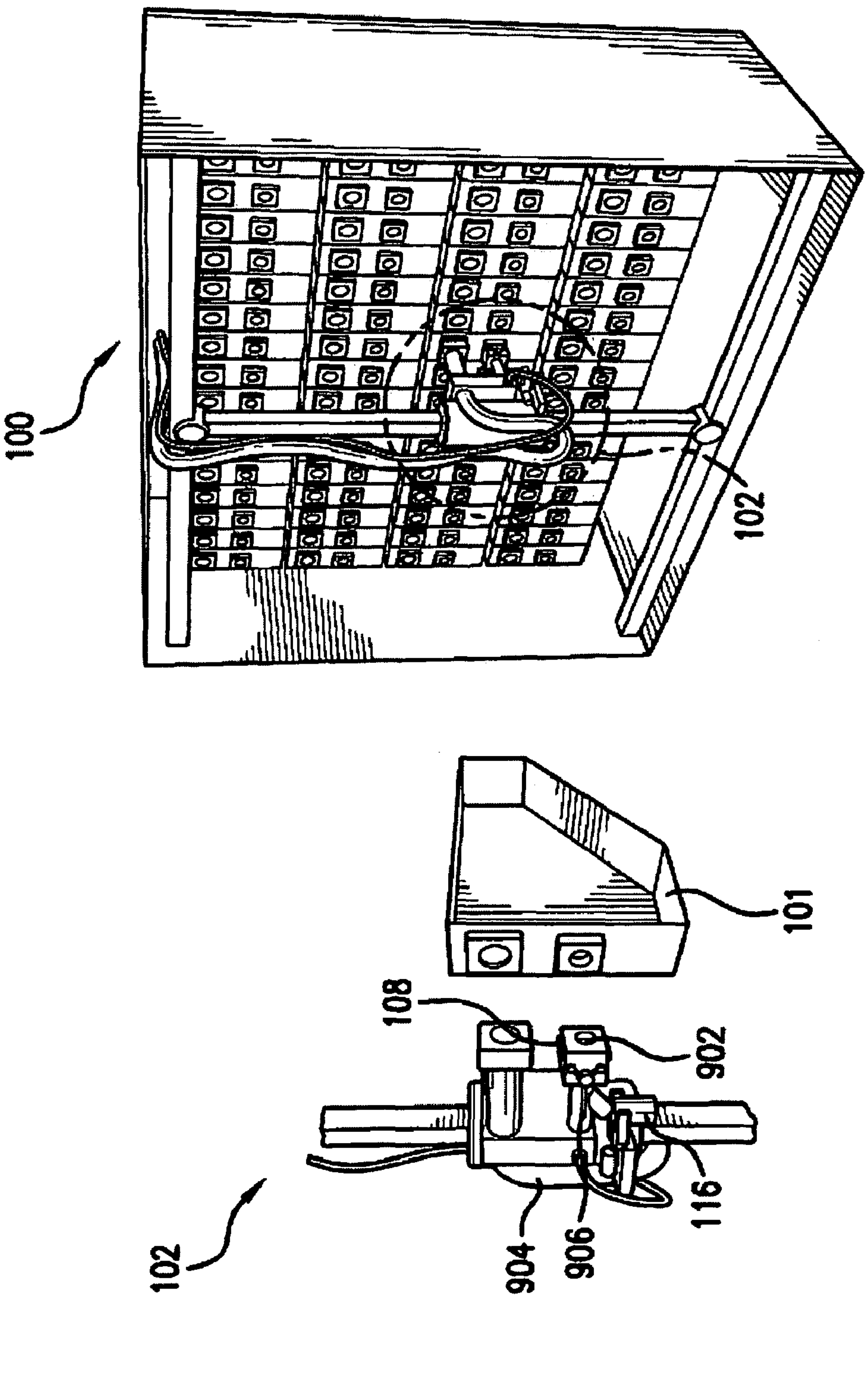
FIG. 9 depicts a detailed view of the end-effector model of an embodiment of the present invention.

FIG. 9 depicts end-effector 102 shown in FIG. 1A. In the preferred embodiment, end-effector 102 includes counter 108, pill vial 116, gating actuator 902, high-pressure air or vacuum source 904 and vacuum extractor 906. Next to end-effector 102 is bin 101. End-effector 102 may also include a torque source for rotation of transport substrate 104 inside bin 101. Preferably, the torque source controls speed and position of the rotation, depending on the number of pills required to be dispensed, may have a brake that can stop rotation, and can reverse direction to return pills to the bin and avoid accidental overfilling. In the preferred embodiment, the torque source is held in position on the end-effector by at least one spring. The spring allows the torque source an amount of tolerance or "compliance" and ability to mate with a bin if the end-effector does not properly align the torque source with the bin.

In addition to the torque source, a timing belt may be required to transfer torque from the motor to transport substrate 104. The motor may be any conventional electric motor used in the prior art.

In another embodiment, counter 108, held on end-effector 102, slides over and straddles the transport substrate of each bin to count the pills. Preferably, the vacuum extractor 906 embedded in end-effector 102 mates to bin 101 and provides the force for the local attraction points, the separated article guide booster, the cross-flow misplaced article ejection and the overflow article return.

A mechanism controller, also attached to end-effector 102, operates the electro-mechanical functions of the system of the present invention. The mechanism controller drives and monitors the entire system and is similar to systems of the prior art. The mechanism controller may consist of a micro-controller, LCD, keypad, etc., and may preferably be connected to a user-interface. In the preferred embodiment, the mechanism controller receives a command or request for a certain number of articles from a specific bin. The mechanism controller may then activate the LAPs, transport substrate and misplaced article ejection to begin the process of extracting articles from the pool. The mechanism controller is also responsible for tallying the number of articles that pass through the counting zone 108. The mechanism controller may also act as a closed-loop controller that receives feedback signals from the counter. It can control the vacuum pressure and speed of the torque source as needed based on the number and type of articles being collected. Vacuum pressure will also vary based on size and type of pill, with more force being necessary to attract heavier pills. The mechanism controller further controls movement and operation of end-effector 102.

Figure 10A:
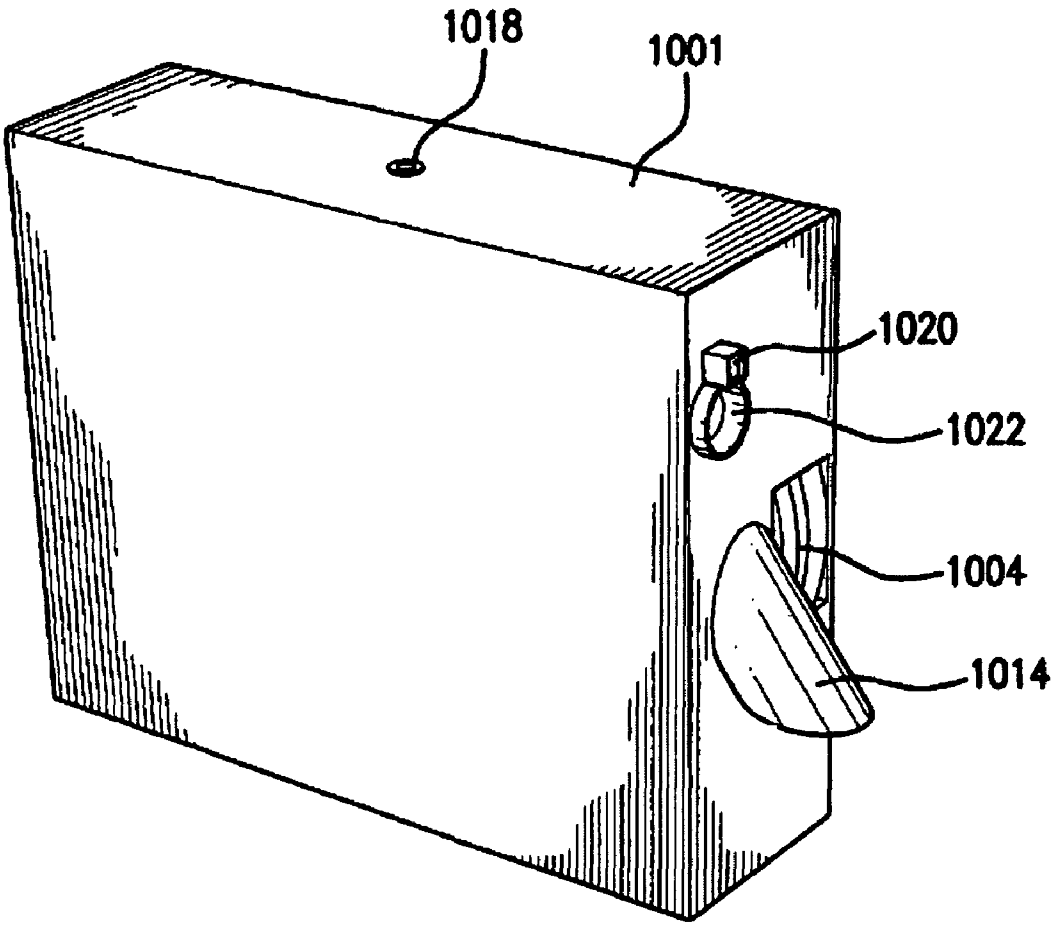
FIG. 10A depicts a view of a single bin of the preferred embodiment.

FIG. 10A depicts a bin 1001 of the preferred embodiment of the present invention. The figure depicts a vacuum check valve 1018 that allows airflow through the bin during operation of vacuum applied to the transport substrate 1004. The surface of the bin 1001 contains a counter interface 1020 and vacuum interface 1022 that mate with an end-effector 1200 (not shown). Also shown are the external surface of a transport substrate 1004 and a separated article guide 1014.

Figure 10B:
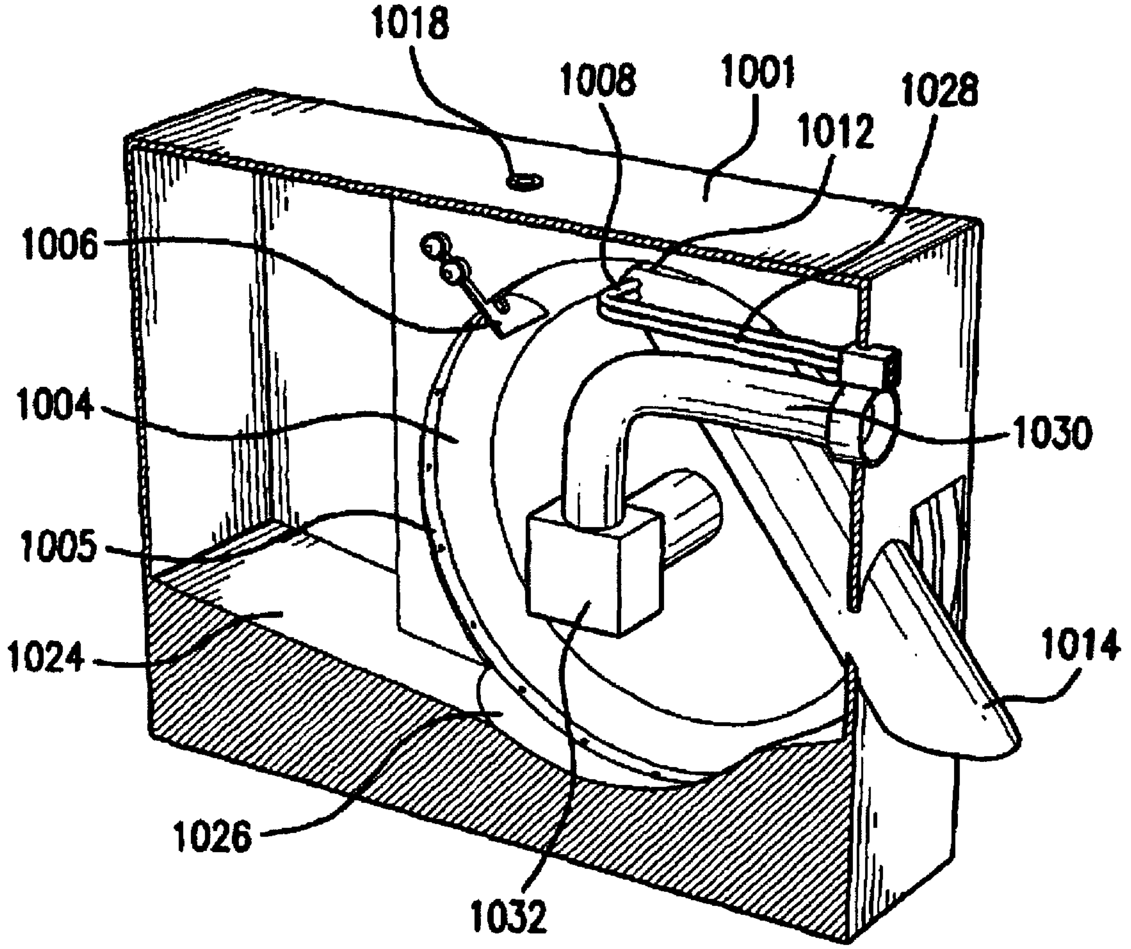
FIG. 10B depicts a cut away view of a bin of the preferred embodiment highlighting the front end of the bin.

FIG. 10B depicts a cut-away view of the bin 1001 of FIG. 10A. Shown are the main components per bin 1001 include the a transport substrate 1004, a misplaced article ejector 1006, a cleave point 1012, a first counting zone 1008 provided at the end of a counter infrastructure 1028, a vacuum infrastructure 1030, a bearing 1032 at the juncture of the vacuum infrastructure 1030 and the transport substrate 1032 that allows the vacuum to pass from the end-effector 1200 (not shown) through the transport substrate 1004, and a separated article guide 1014. The bottom 1024 of the bin 1001 is slanted to direct pills or other articles (not shown) contained within bin 1001 towards and over the transport substrate 1004. A bowl shaped bottom 1026 of the bin 1001 is provided to guide pills or articles to the local attraction points 1005 on the transport substrate 1004.

Figure 10C:
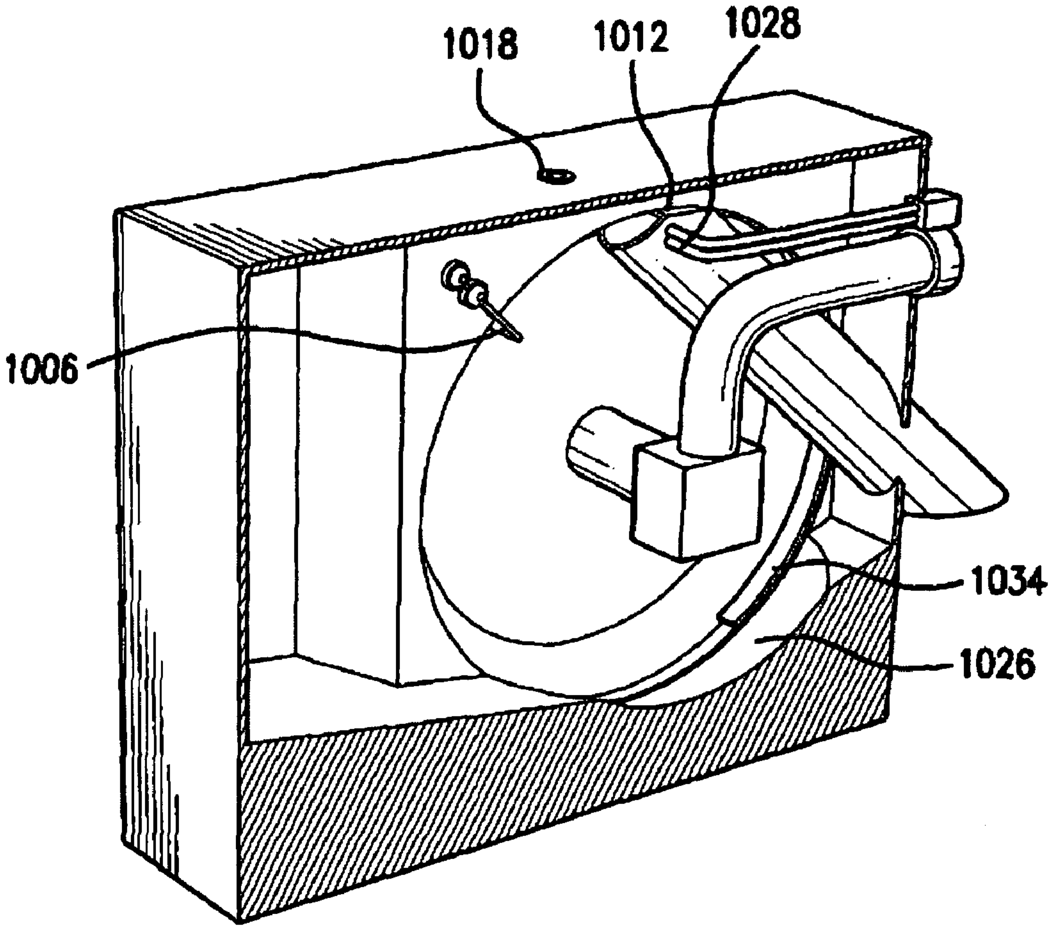
FIG. 10C depicts a cut away view of a bin of the preferred embodiment highlighting the back end of the bin.

FIG. 10C depicts a rearview perspective of bin 1001 of FIG. 10B. A vacuum neutralization plate 1034 covers a portion of the transport substrate 1004, blocking local attraction points 1005 to aid in removing pills or articles at the cleave point 1008 and to increase vacuum pressure at other local attraction points 1005.

Figure 11:
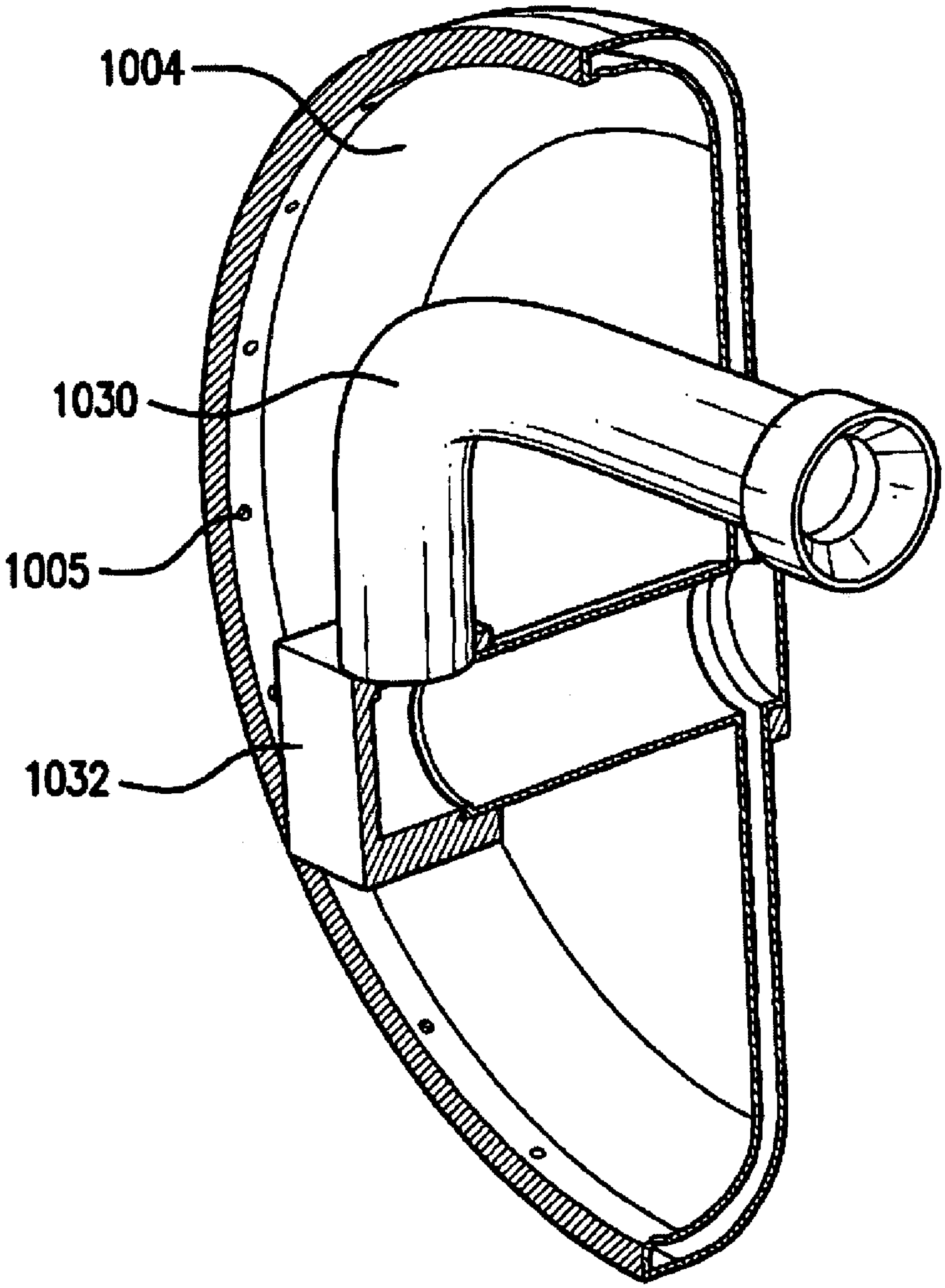
FIG. 11 depicts a sectional view of the transport substrate of the preferred embodiment.

FIG. 11 is a sectional view of the transport substrate 1004 of the preferred embodiment of the present invention. As shown in this figure, the transport substrate 1004 of the preferred embodiment is hollow, allowing a vacuum to be passed through the bearing 1032 and vacuum infrastructure 1030 to the transport substrate 1004 and ultimately through the local attraction points 1005.

Figure 12:
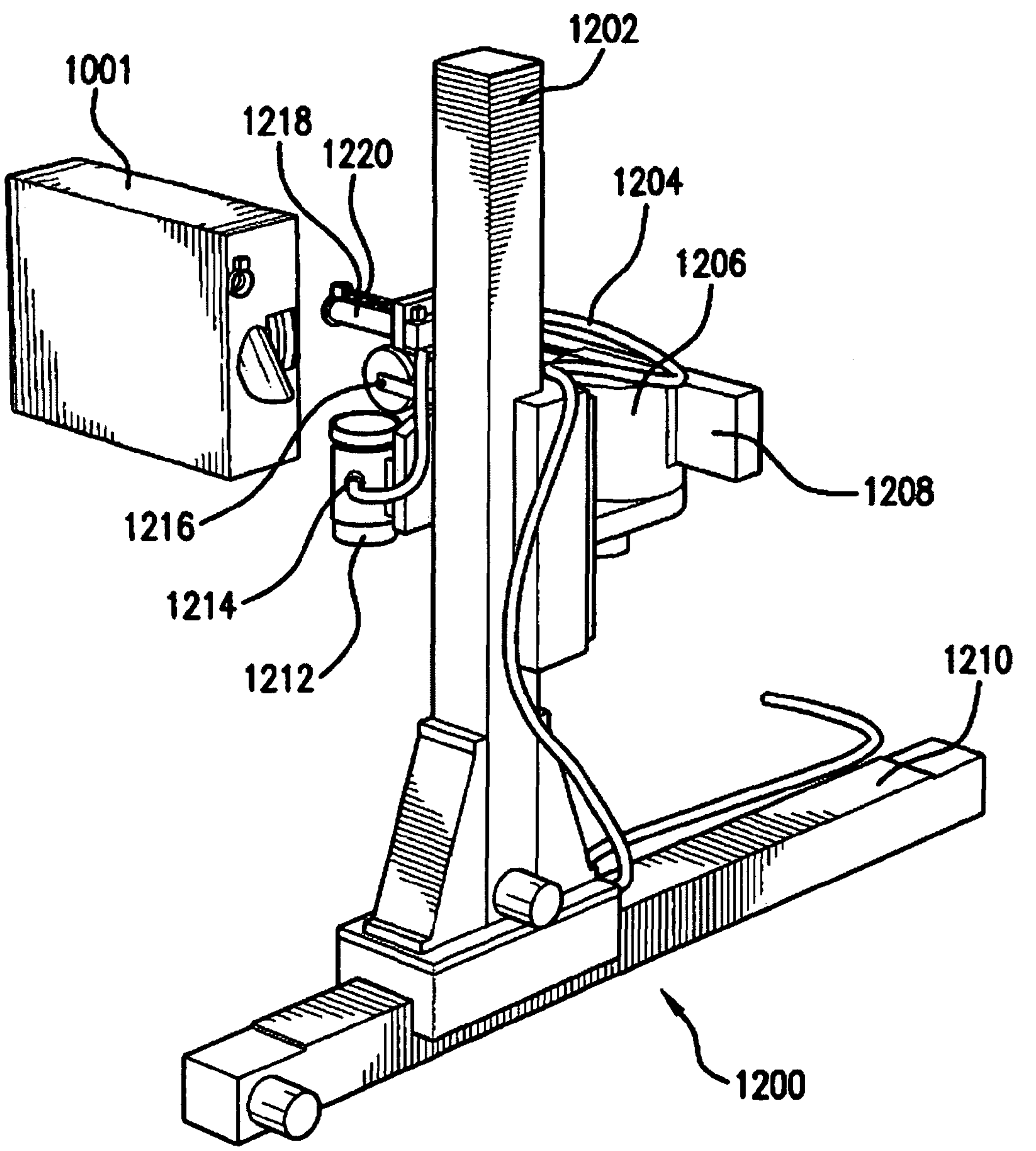
FIG. 12 depicts an end-effector in front of a bin.

FIG. 12 depicts the preferred embodiment of an end-effector 1200 situated in front of a bin 1001 of the present invention. The end-effector 1200 provides a vacuum source to each bin 1001 through a supply-side vacuum interface 1218 which is supplied by a vacuum supply line 1204, supplies the counter mechanism through the supply-side counter interface 1220 and powers the rotation of the transport substrate (not shown) via a torque source 1216.

In operation, the end-effector 1200 is positioned in front of a selected bin 1001 through operation of a Z-axis linear actuator 1202, Z-axis rotary actuator 1206, Y-axis linear actuator 1208 and an X-axis linear actuator 1210, each of which facilitate the placement of the end-effector 1200 three-dimensionally in space. After proper positioning, the end-effector 1200 provides the bin 1001 with vacuum, counting and torque capabilities and collects the articles dispensed from the bin 1001 in a vial 1212 held by holder 1214. In the preferred embodiment, the vial holder 1214 holds the vial 1212 utilizing a vacuum, however, one skilled in the art will recognize that that the vial 1212 may be held in any number of fashions, including but not limited to, clasping arms, seated positioning, a shelf, etc.

Figure 13A:
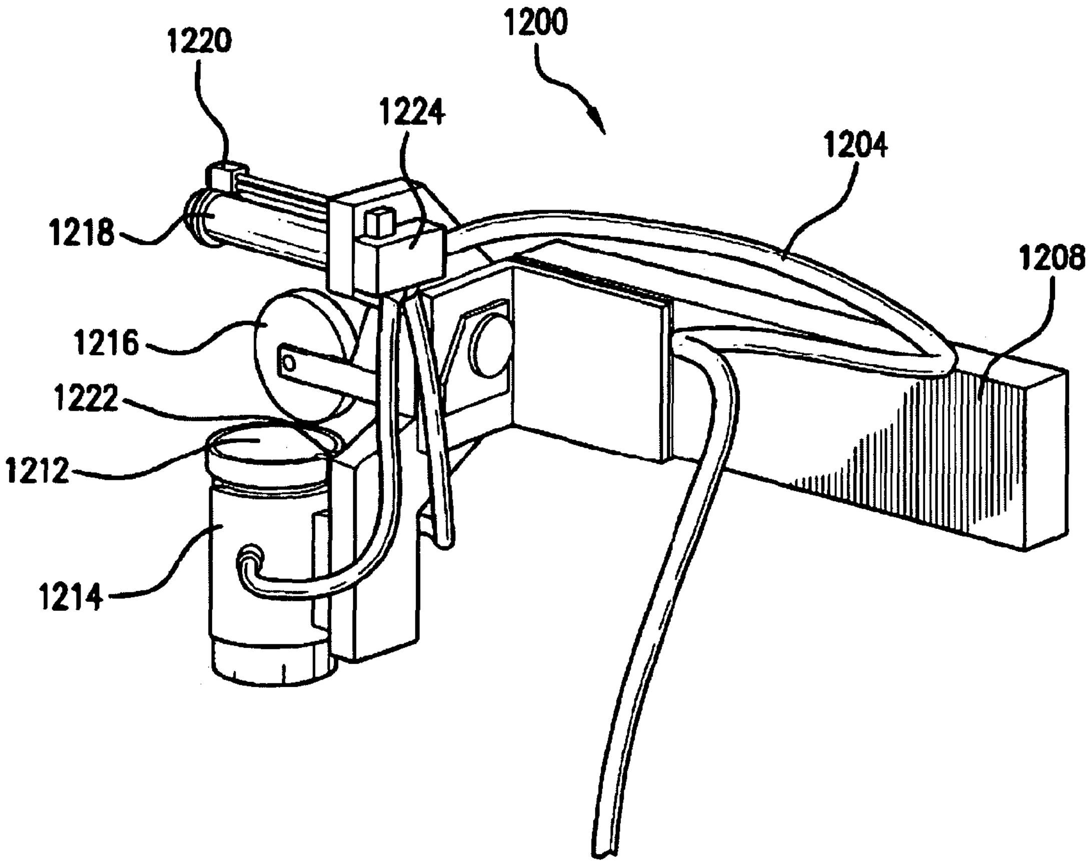
FIG. 13A depicts a rear view of an end-effector of the preferred embodiment.

FIG. 13A depicts a magnified rear view of the end-effector 1200 of the preferred embodiment of the present invention. The magnified view depicts a second count zone 1222, best seen in the next figure, which allows a redundant counting and possible color identification for quality control of articles dispensed for both accuracy and determining whether articles counted within the bin 1001 have properly been cleaved and dispensed.

Figure 13B:
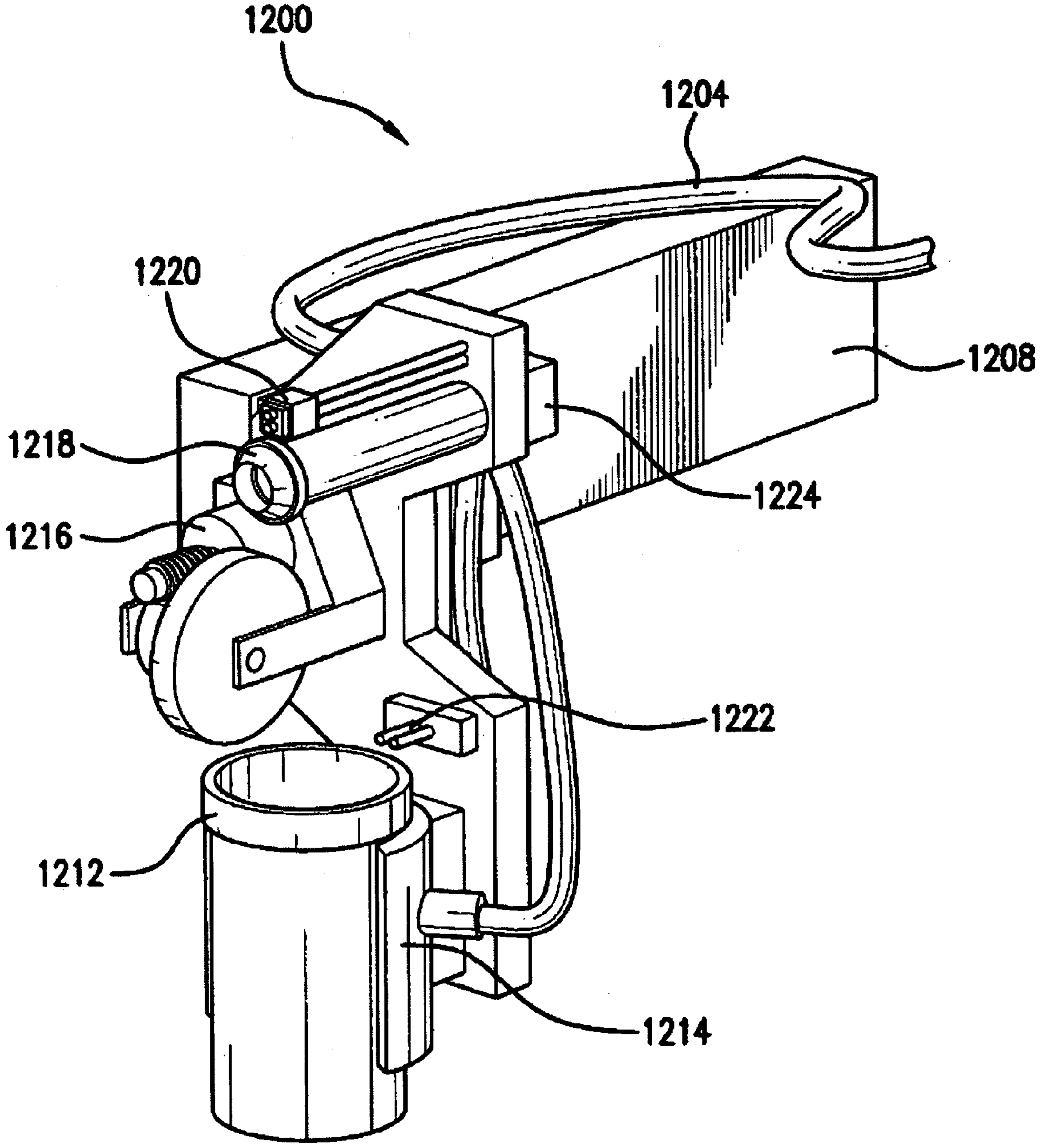
FIG. 13B depicts a front view of an end-effector of the preferred embodiment.

FIG. 13B depicts a magnified front view of the end-effector 1200 of the preferred embodiment of the present invention. A vial holder 1214 utilizing a vacuum based design is depicted.

Figure 14A:
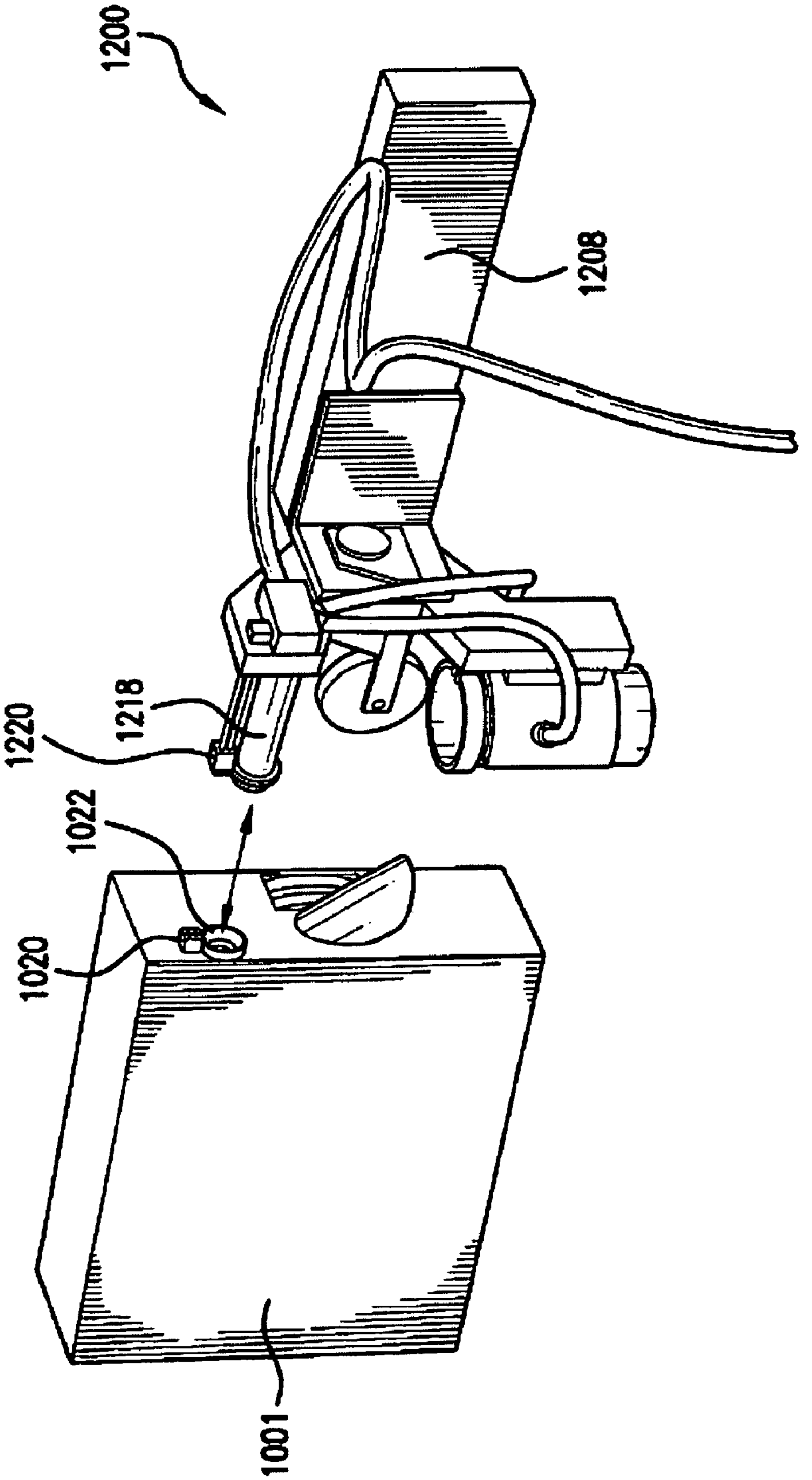
FIG. 14A depicts an end-effector interfacing with a bin.
Figure 14B:
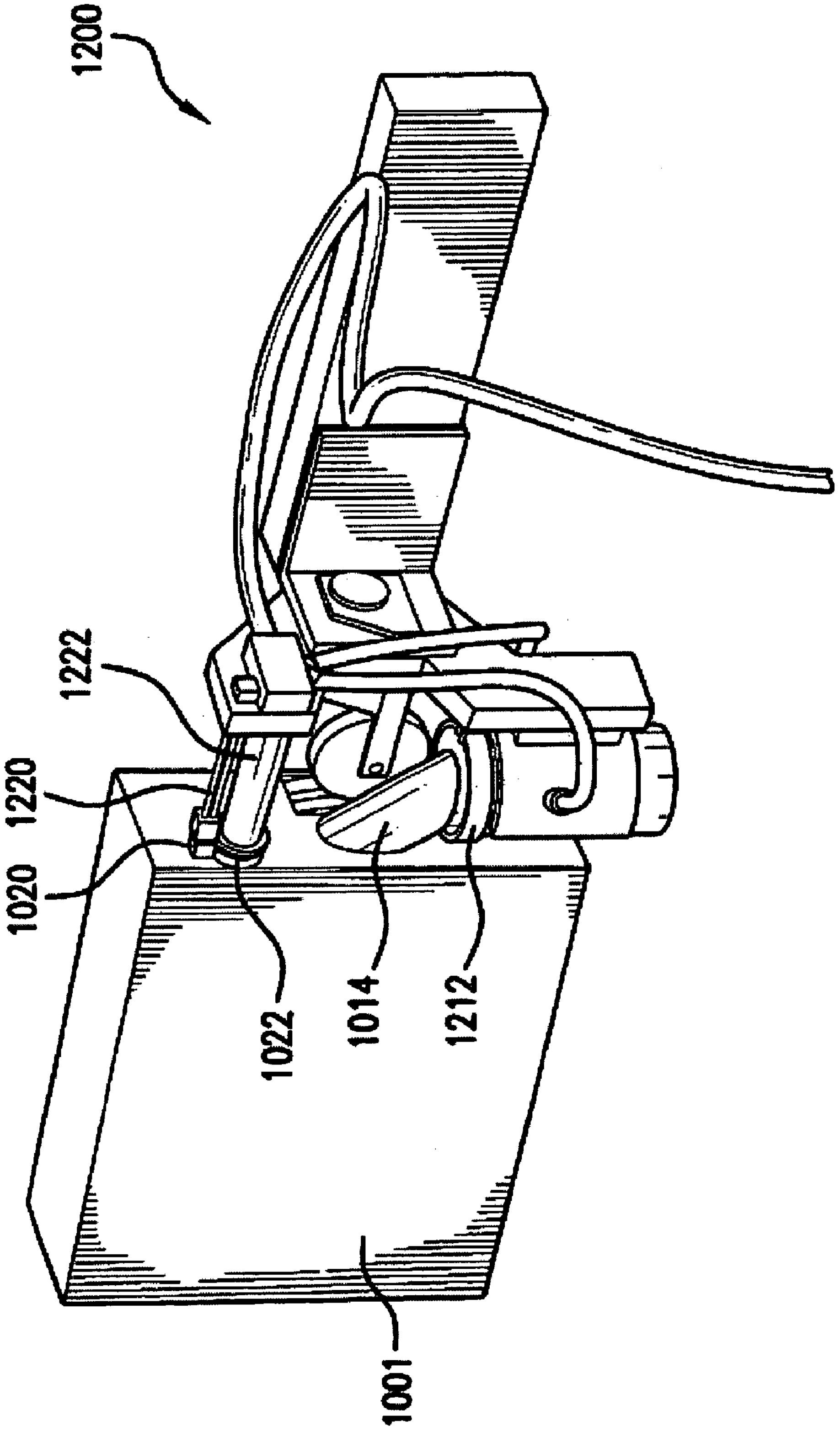
FIG. 14B depicts the positioning of an end-effector with respect to a bin while interfaced.
Figure 14C:
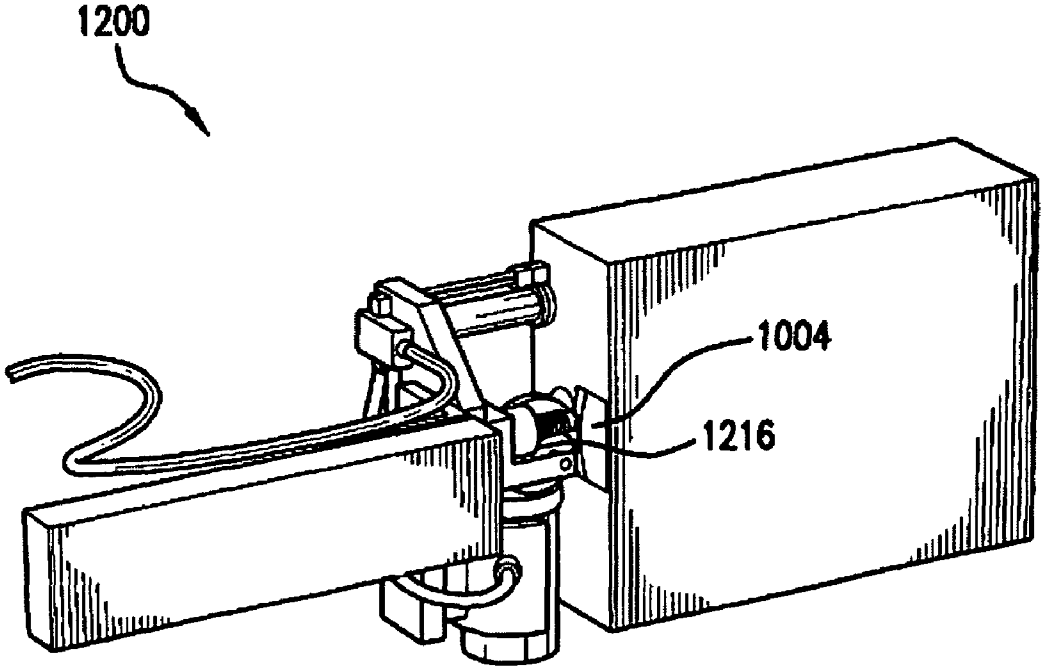
FIG. 14C depicts an alternate perspective of the positioning of an end-effector with respect to a bin while interfaced.

FIGS. 14A-C depict the end-effector 1200 interfacing with a bin 1001. FIG. 14A depicts an end-effector 1200 properly aligned with a bin 1001. The end-effector 1200 is aligned such that the supply-side vacuum interface 1220 and the supply-side counter interface properly line up with the vacuum interface 1020 and the counter interface 1022 of the bin 1001, respectively. As well, the torque source 1216 properly connects with the outer surface of the transport substrate 1004 to spin the transport substrate 1004 during operation (best seen in FIG. 14C).

FIG. 14B depicts the end-effector 1200 completely interfaced with a bin 1001. After the end-effector 1200 is completely interfaced, a vial 1212 held by holder 1214 is properly positioned under the separated article guide 1014 to collect dispensed articles from the bin 1001. FIG. 14C depicts a rear view of the end-effector 1200 interfaced with a bin 1001.

Figure 15:
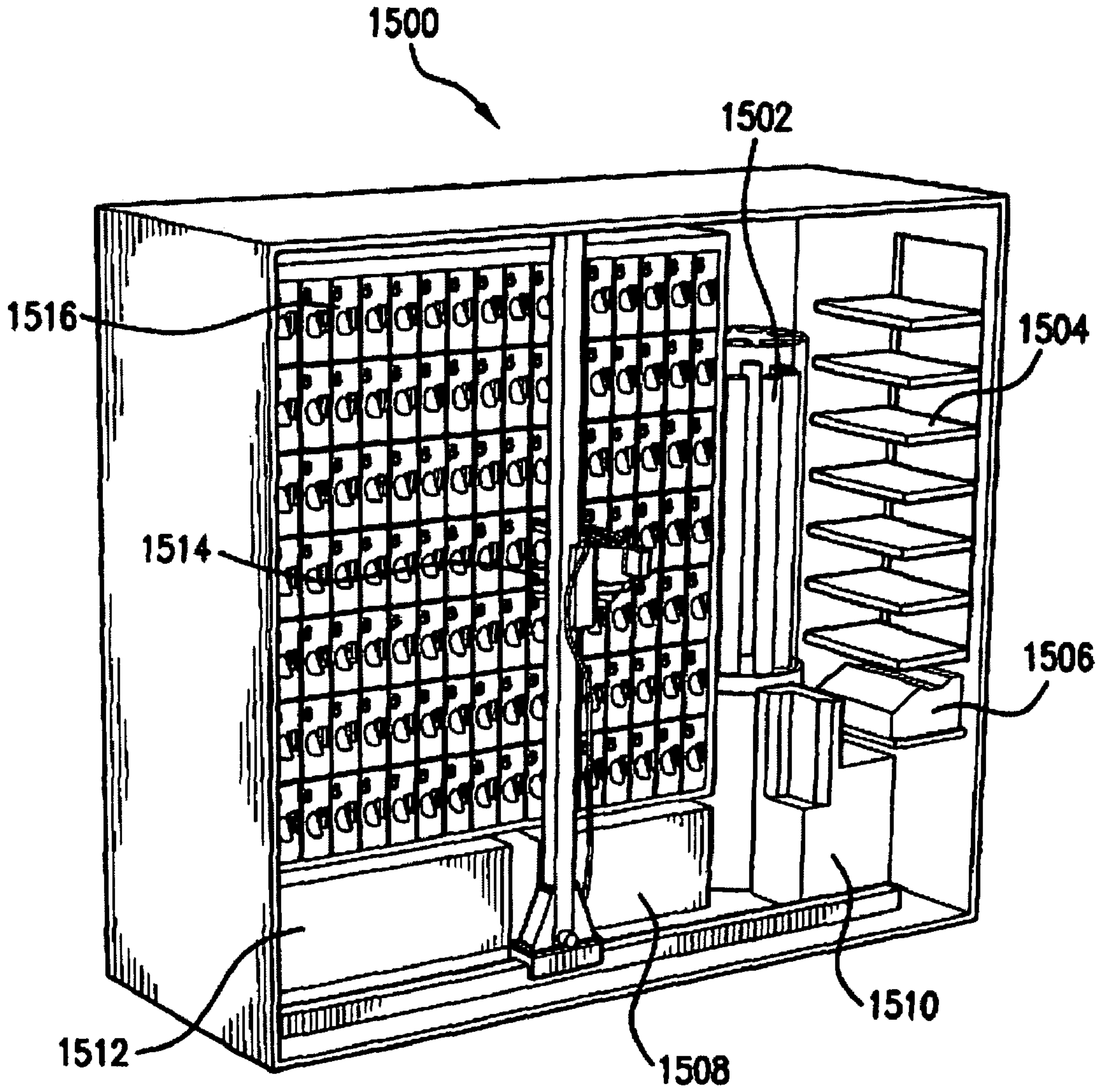
FIG. 15 depicts the preferred embodiment of an automated article dispensing system of the present invention combining multiple bins, an end-effector and various components necessary for properly filling, labeling and capping vials.

FIG. 15 depicts an automated dispensing system 1500 of the preferred embodiment of the present invention. The system 1500 contains a plurality of bins 1516, each preferably containing a unique article to be dispensed. The bins 1516 are provided with functional elements (torque, counting means, vacuum means, etc.) by the end-effector 1514, which collects articles from the bin 1516. The end-effector 1514 is connected to electronics 1512 that provide instructions to the end-effector 1514 as to which bin 1516 to operate, and the number of articles to be dispensed. For example, in an automated pharmacy application, a user would provide information pertinent to a prescription to be filled, such as the particular pill to be dispensed, the number of pills to be dispensed and information associated with a patient to be included on a label. The electronics 1512 would activate the end-effector 1514 to fill the prescription according to the information entered.

One skilled in the art will recognize that the electronics 1512 may be supplied with commands from a keyboard, cursor control device, scanned barcode, smart card, separate computer system, etc. (not shown) providing information regarding the articles to be dispensed. One skilled in the art would also recognize that a keyboard, cursor control device or separate means may be connected to the electronics 1512 either directly, over a local network, or via the internet.

The system 1500 also includes a vial carousel 1502 for providing vials for use by the end-effector 1514, a label printer 1506 for creating labels depicting the vial contents, a capper 1510 for sealing vials and a vacuum source 1508 to provide the end-effector 1514 a vacuum for application to a bin 1516.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. An apparatus for collecting and dispensing articles, said apparatus comprising:

a controller for controlling said article transport substrate, for controlling said vacuum source and for controlling said torque source wherein said hollow circular shell comprises a first end and a second end, wherein said hollow shell comprises an internal transporting surface which extends upwardly and inwardly from said first end to a midpoint in said hollow circular shell, and which extends upwardly and inwardly from said second end to said midpoint in said hollow circular shell, and wherein at said midpoint is positioned said plurality of apertures wherein said controller utilizes a closed loop control feedback mechanism to selectively control the pressure of said vacuum source in combination with the rest of the claim language is not taught or fairly suggested by the prior art.

2. The apparatus of claim 1, further comprising a housing or bin, wherein said housing or bin has a downward sloping bottom surface, and wherein said article transport substrate is within said housing or bin.

3. The apparatus of claim 2, wherein at each of said aperture, said torque source creates a centrifugal force perpendicular to said internal transporting surface which extends away from said midpoint of said hollow circular shell and is aligned in a direction parallel to a force being applied by said vacuum source on said apertures for assisting said vacuum source to facilitate an adherence of said article to said aperture, or to facilitate an adherence of said article to said internal transporting surface near or in the vicinity of said aperture, of said plurality of apertures, and further wherein said article is transported from said bin in a direction of travel towards a dispensing route.

4. The apparatus of claim 1, wherein said torque source comprises a motor or crank, and wherein said motor or crank can vary speed, position or direction of said article transport substrate.

5. The apparatus of claim 1, further comprising a means for ejecting misplaced articles.

6. The apparatus of claim 5, wherein said means for ejecting misplaced articles is selected from the group consisting of a brush, gravity, a mechanical filter, uneven surface contours and a cross-flow air flow.

7. The apparatus of claim 1, further comprising a channel for dispensing said articles.

8. The apparatus of claim 5, wherein said means for ejecting misplaced articles selects said article based on a shape or a size.

9. The apparatus of claim 1, further comprising means for separating said article from said article transport substrate.

10. The apparatus of claim 9, wherein said means for separating said article is selected from the group consisting of a vacuum neutralizing plate, and a shear plate, wherein said vacuum neutralizing plate further increases said negative pressure through said apertures.

11. The apparatus of claim 1, wherein said article transport substrate is selected from the group consisting of nested bowls, a hollow ring, and a hollow cylindrical shape.

12. The apparatus of claim 1, further comprising a focused air source to aid in article singulation.

13. The apparatus of claim 1, further comprising means for returning excess articles to said apparatus.

14. The apparatus of claim 1, wherein said controller transmits information to and receives information from a user-interface.

15. The apparatus of claim 1, wherein said controller operates according to manual input and feedback from at least one sensor.

16. The apparatus of claim 15, wherein each of said vacuum source, said torque source, at least one sensor, and a controller are integrated onto an end-effector.

17. The apparatus of claim 16, wherein said end-effector is independent of said housing or bin.

18. The apparatus of claim 15, wherein said at least one sensor detects said articles.

* * * * *

UNITED STATES PATENT AND TRADEMARK OFFICE

CERTIFICATE OF CORRECTION

PATENT NO. : 8,091,733 B2
APPLICATION NO. : 12/798551
DATED : January 10, 2012
INVENTOR(S) : Jason A. Janet and David Reinfeld It is certified that error appears in the above-identified patent and that said Letters Patent is hereby corrected as shown below:

Col. 15, Line 21-39
In the claims: Please correct Claim 1 as follows.

1. An apparatus for collecting and dispensing articles, said apparatus comprising:
an article transport substrate having a plurality of apertures;
a vacuum source for creating a negative pressure through said apertures; and
a torque source for rotating said article transport substrate;
a controller for controlling said article transport substrate, for controlling said vacuum source and for controlling said torque source;
wherein each article is collected or dispensed by said apparatus,
wherein a gravity vector assists said articles to achieve an association with said apertures,
wherein centrifugal force assists said articles maintaining said association with said aperture,
wherein said article transport substrate is rotatable and comprises a hollow circular shell for conveying said articles,
wherein said hollow circular shell comprises a first end and a second end,
wherein said hollow shell comprises an internal transporting surface which extends upwardly and inwardly from said first end to a midpoint in said hollow circular shell, and which extends upwardly and inwardly from said second end to said midpoint in said hollow circular shell, and wherein at said midpoint is positioned said plurality of apertures,
wherein said internal transporting surface being perpendicular to a gravity vector; and
wherein said controller utilizes a closed loop control feedback mechanism to selectively control the speed or direction of said torque source or the pressure of said vacuum source.
~~in combination with the rest of the claim language is not taught or fairly suggested by the prior art.~~

Signed and Sealed this
Twelfth Day of June, 2012

David J. Kappos
*Director of the United States Patent and Trademark Office*

UNITED STATES PATENT AND TRADEMARK OFFICE

CERTIFICATE OF CORRECTION

PATENT NO. : 8,091,733 B2
APPLICATION NO. : 12/798551
DATED : January 10, 2012
INVENTOR(S) : Jason A. Janet and David Reinfeld It is certified that error appears in the above-identified patent and that said Letters Patent is hereby corrected as shown below:

In the Claims:

Please reinstate Claim 19 as follows.

19. The apparatus of claim ~~18~~ 13, wherein said means for returning excess articles comprises a gate.

Signed and Sealed this
Thirtieth Day of April, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,091,733 B2
APPLICATION NO. : 12/798551
DATED : January 10, 2012
INVENTOR(S) : Jason A. Janet and David Reinfeld It is certified that error appears in the above-identified patent and that said Letters Patent is hereby corrected as shown below:

Delete title page and substitute therefore with the attached title page showing the corrected number of claims in the patent.

In the Claims:

Column 16, line 49, Claim 19 insert as follows.

--19. The apparatus of claim ~~18~~ 13, wherein said means for returning excess articles comprises a gate.--

This certificate supersedes the Certificate of Correction issued April 30, 2013.

Signed and Sealed this
Twenty-eighth Day of May, 2013

Teresa Stanek Rea
*Acting Director of the United States Patent and Trademark Office*

(12) United States Patent
Janet et al.

(10) Patent No.: US 8,091,733 B2
(45) Date of Patent: Jan. 10, 2012

(54) AUTOMATED ARTICLE DISPENSATION MECHANISM

(75) Inventors: Jason A. Janet, Durham, NC (US); David Reinfeld, Englewood, NJ (US)

(73) Assignee: RxMedic Systems, Inc., Raleigh, NC (US)

(*) Notice: Subject to any disclaimer, the term of this patent is extended or adjusted under 35 U.S.C. 154(b) by 0 days.

(21) Appl. No.: 12/798,551

(22) Filed: Apr. 6, 2010

(65) Prior Publication Data

US 2010/0268376 A1 Oct. 21, 2010

Related U.S. Application Data

(63) Continuation of application No. 10/886,494, filed on Jul. 7, 2004, now Pat. No. 7,726,514.

(51) Int. Cl.
*B65G 59/04* (2006.01)
*B65H 3/08* (2006.01)
*B65H 5/00* (2006.01)
*G07F 11/10* (2006.01)

(52) U.S. Cl. ........... 221/211; 211/224; 211/252; 211/9; 211/13; 211/195; 211/196; 211/200; 221/202; 221/203; 221/207; 221/254; 221/258; 221/263; 221/266; 221/277; 221/298; 221/253

(58) Field of Classification Search ................. 221/211, 221/252, 9, 13, 195, 196, 200, 202, 203, 221/207, 254, 258, 263, 266, 277, 298, 253
See application file for complete search history.

(56) References Cited

U.S. PATENT DOCUMENTS

| | | | | | |
|---|---|---|---|---|---|
| 3,412,908 | A | * | 11/1968 | Ferrault | 222/636 |
| 4,018,358 | A | * | 4/1977 | Johnson et al. | 221/7 |
| 4,664,289 | A | * | 5/1987 | Shimizu et al. | 221/2 |
| 5,027,725 | A | * | 7/1991 | Keeton | 111/184 |
| RE35,743 | E | * | 3/1998 | Pearson | 221/2 |
| 6,085,938 | A | * | 7/2000 | Coughlin | 221/203 |
| 2003/0111484 | A1 | * | 6/2003 | Pearson et al. | 221/211 |
| 2003/0116068 | A1 | * | 6/2003 | Sauder et al. | 111/180 |
| 2005/0224510 | A1 | * | 10/2005 | Remis et al. | 221/69 |
| 2008/0061074 | A1 | * | 3/2008 | Remis et al. | 221/69 |

* cited by examiner

*Primary Examiner* — Gene Crawford
*Assistant Examiner* — Rakesh Kumar
(74) *Attorney, Agent, or Firm* — Thomas L. Moses; Monahan & Moses, LLC

(57) ABSTRACT

Disclosed is a system for collecting, sorting, counting and consolidating an unorganized pool of solid or semi-solid articles such as pills for dispensation. Specifically, the articles are extracted from inside a bin using attraction points on a transport substrate and sorted into containers in finite quantities. The system consists of several components, preferably including a torque source, a counter and a vacuum source, which are uniquely integrated onto a single end-effector to reduce cost and redundancy by servicing several bins. Further, the system presents a method of attracting and carrying pills using negative vacuum pressure, gravity and centrifugal force. This centrifugal force holds articles to the local attraction points and is provided by the spinning of the transport substrate. Pills are collected from the bin or plenum at the local attraction points, counted, cleaved from the local attraction points and guided to a container or vial.

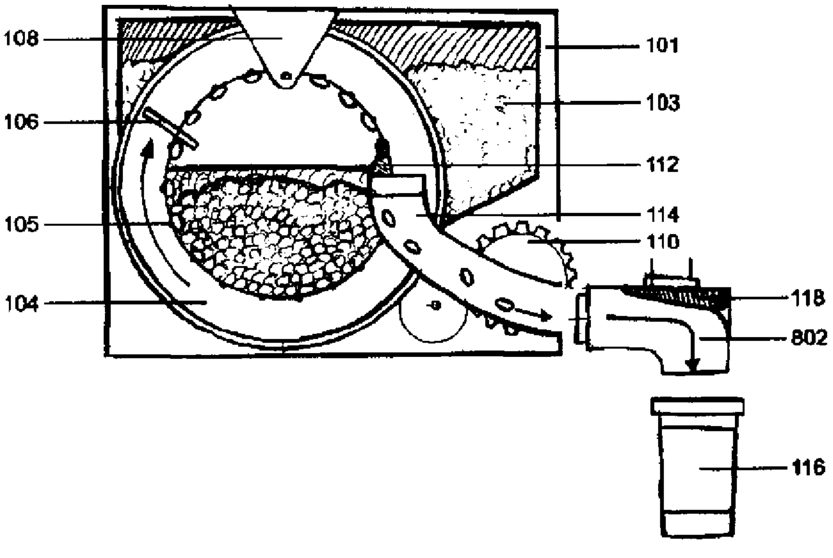

19 Claims, 26 Drawing Sheets